United States Patent
Nyamekye et al.

(10) Patent No.: US 11,511,220 B2
(45) Date of Patent: Nov. 29, 2022

(54) ULTRA-HIGH PURITY, ULTRA-HIGH PERFORMANCE DIATOMITE FILTRATION MEDIA

(71) Applicant: EP MINERALS, LLC, Reno, NV (US)

(72) Inventors: George A. Nyamekye, Sparks, NV (US); Scott Kevin Palm, Reno, NV (US); Peter E. Lenz, Reno, NV (US); Qun Wang, Reno, NV (US)

(73) Assignee: EP Minerals LLC, Reno, NV (US)

( * ) Notice: Subject to any disclaimer, the term of this patent is extended or adjusted under 35 U.S.C. 154(b) by 511 days.

(21) Appl. No.: 16/476,210

(22) PCT Filed: Jan. 6, 2017

(86) PCT No.: PCT/US2017/012568
§ 371 (c)(1),
(2) Date: Jul. 5, 2019

(87) PCT Pub. No.: WO2018/128623
PCT Pub. Date: Jul. 12, 2018

(65) Prior Publication Data
US 2019/0351355 A1    Nov. 21, 2019

(51) Int. Cl.
*B01D 39/20* (2006.01)
*B01J 20/14* (2006.01)
*B01J 20/28* (2006.01)
*B01J 20/30* (2006.01)

(52) U.S. Cl.
CPC .......... *B01D 39/2068* (2013.01); *B01J 20/14* (2013.01); *B01J 20/28011* (2013.01); *B01J 20/3071* (2013.01); *B01J 20/3078* (2013.01); *B01D 2239/0457* (2013.01)

(58) Field of Classification Search
CPC ................ B01D 39/20; B01D 39/2068; B01D 2239/0457; B01J 20/14; B01J 20/28011; B01J 20/3071; B01J 20/3078
USPC ....................................................... 502/412
See application file for complete search history.

(56) References Cited

U.S. PATENT DOCUMENTS

| | | | |
|---|---|---|---|
| 3,702,886 A | | 11/1972 | Argauer et al. |
| 4,367,215 A | | 1/1983 | Gjelsvik et al. |
| 5,656,568 A | † | 8/1997 | Shiuh |
| 7,122,080 B2 | | 10/2006 | Pruett et al. |
| 2001/0023233 A1 | | 9/2001 | Shiuh et al. |
| 2004/0173057 A1 | | 9/2004 | Fairbourn |
| 2010/0323073 A1 | | 12/2010 | Lu |
| 2011/0172341 A1 | | 7/2011 | Von Benten |
| 2014/0000487 A1 | | 1/2014 | Wang |
| 2014/0369904 A1 | | 12/2014 | Boudreault et al. |
| 2016/0332135 A1 | | 11/2016 | Taniguchi |

FOREIGN PATENT DOCUMENTS

| | | |
|---|---|---|
| CN | 102923724 A | 2/2013 |
| JP | 2001097711 A | 4/2001 |
| WO | 2012049527 A2 | 4/2012 |
| WO | 2016032745 A1 | 3/2016 |
| WO | 2016115212 A1 | 7/2016 |
| WO | 201619613 A1 | 12/2016 |
| WO | 2016196137 A1 | 12/2016 |

OTHER PUBLICATIONS

Aguilar-Mamani, W. et al. "Comparison Between Leached Metakaolin And Leached Diatomaceous Earth As Raw Materials For The Synthesis of ZSM-5," SpringerPlus 2014, 3:292. Retrieved from Internet: <URL: http://www.pringerplus.com/content/3/1/292>.
Advanced Minerals Corporation "Regulator Support Package AMC10-Celpure P" Technical Note (2005) (70 Pages).†
Advanced Minerals Corporation "Regulator Support Package AMC10-Celpure C" Technical Note (2007) (77 pages).†

† cited by third party

*Primary Examiner* — Edward M Johnson
(74) *Attorney, Agent, or Firm* — The Webb Law Firm

(57) ABSTRACT

This invention concerns ultra-high purity, ultra-high performance biogenic silica filtration products comprising diatomaceous earth. In particular, it relates to products comprising diatomaceous earth which is derived from ores that have been specifically selected for their naturally low centrifuged wet density and which have been intensively beneficiated to reduce extractable impurities to near or below detection limits. The low centrifuged wet density of the selected natural ore is either maintained or further reduced through the beneficiation process, which provides for filtration product/media with high particulate holding capacities able to provide for extended filtration cycle times.

26 Claims, 7 Drawing Sheets

ULTRA-HIGH PURITY, ULTRA-HIGH PERFORMANCE DIATOMITE FILTRATION MEDIA

FIELD OF THE INVENTION

This disclosure concerns Ultra-High Purity, Ultra-High Performance ("Fenon") biogenic silica products, which are characterized by extremely high purity bulk chemistry, extremely low soluble impurities, and high silica specific volume. These characteristics provide for high filtration performance, in terms of low unit consumption and longer filtration cycle times. These characteristics are of particular value in the separation of solids from high purity liquids in specialty chemical, specialty beverage and life science applications.

BACKGROUND

Diatomite (sometimes called diatomaceous earth or kieselguhr) is a sedimentary rock that comprises the remnant skeletons of diatoms, single-celled plants that inhabit the surface of many stationery bodies of water, and other minerals, such as clays, volcanic ash, calcite, dolomite, feldspars and silica sand, that are deposited through the forces of air and water. Diatomite deposits may also contain organic contaminants, which may also be associated with sulfur and arsenic.

Hundreds of different species of diatoms, which are characterized by unique frustule shapes, have been identified as living organisms through the frustules contained in deposits of diatomaceous earth.

Commercial diatomite deposits typically contain in the range of 80-90 wt % $SiO_2$, alumina (0.6-8 wt % $Al_2O_3$), iron (0.2-3.5 wt % $Fe_2O_3$), alkali metal oxides, $Na_2O$ and MgO (less than 1 wt %), CaO (0.3-3 wt %) and, sometimes, minor amounts of other impurities, such as $P_2O_5$ and $TiO_2$ (Mahani, H. et al., 2003, Breese, R. O. Y. et al., 2006). The fine intricate and porous nature of the diatoms skeletal structure provides for lower density, high surface area and permeability that helps distinguish diatomite from other forms of silicate minerals. The pore structure of diatomaceous earth comprises macropores, mesopores and micropores, which provide for wetting and high absorptive capacity necessary in certain formulations involving the use of diatomite products (Mikulasik, et al., U.S. Pat. No. 8,883,860).

The combination of chemical inertness of the silica and the accompanying intricate and porous structure of diatom frustules give diatomite products/media unique commercial value in filtration applications. Diatomite filtration products/media have been used for many years in liquid/solid separation in the food, beverage and chemicals industries. As used herein, the term "media" means one or more medium. Conventional diatomite products/media are used in the processing of wide range of fluids, including beverages (e.g. beer, wine, spirits, and juice), oils (fats, petroleum), waters (swimming pools, drinking water), chemicals (dry cleaning fluid, $TiO_2$ additives), ingestible pharmaceuticals (antibiotics), metallurgy (cooling fluids), agro-food intermediates (amino acid, gelatin, yeast), and sugars (El-Shafey, E. L. et al. 2004).

Diatomite may be used in a filtration process as a pre-coat or as a bodyfeed or a combination of the two, depending on the nature of the material to be filtered and the type of filter employed. In a precoat-only system, a layer of filter aid is built up on the filter septum to protect against the blinding of particulate of the media by recirculating a filter aid slurry. In a bodyfeed-only system, small amounts of filter aid are regularly added to the liquid to be filtered together with the suspended particulates to be removed. This ensures that a new filtering surface is continuously formed that helps to entrap the suspended particulates and at the same time ensure a constant flow rate of the liquid. Large volumes of filtration media are used in the form of precoat-only in rotary vacuum filtration, and large volumes are also used in both precoating and bodyfeeding in pressure filtration systems. Some specialty pressure filtration applications, such as sake filtration use a precoat-only approach. In the end, the selection of a filter aid grade for use in a filtration application generally considers the clarity, flow rate, cycle time and liquid chemical purity required.

In both the precoat and body feed filtration applications the diatomite filter aid product or media will contact the fluid being filtered. One of the potential drawbacks in the use of diatomaceous filtration media as a filter aid is the contribution of metal extractables from the diatomaceous filtration media to the fluid. Increased levels of soluble metals in these applications can affect the purity of the liquid product, as well as the stability and taste of the product. Therefore, conventional filter aid products, when used in food and beverage processing, are required to meet government requirements for purity, such as the US Food Chemicals Codex, as well as specification set by the producers of the liquid products.

Certain liquid processing applications are more sensitive to extractable impurities. For example, parenteral (injectable) pharmaceuticals, high purity chemicals and some specialty beverages often cannot tolerate the level of extractable impurities that are characteristic of conventional, food-grade diatomite products/media. As a result, in these applications, diatomite filtration media, which contribute reduced levels of extractable impurities to the liquids being filtered are preferred and are used in these applications. While some purified diatomite filtration media products have been developed and are used in these applications, the applications for, and need for, ever higher purity liquids, continue to grow, and there is a need for diatomite filtration media with improved purity.

The Fenon ultra-high purity, ultra-high performance filtration products/media of the present disclosure possess unique combinations of ultra-low extractable impurities per unit mass, very low centrifuged wet densities and very high flux rates relative to density. Fenon filtration products/media also provide for significantly reduced unit consumption, in terms of mass consumed per unit of liquid filtered. The combination of very low extractable impurities per unit mass and significantly-reduced consumption of mass per unit of liquid filtered provides a compounding effect in the delivery of liquid purity, and represents a substantial improvement, relative to the prior art, in the capability of diatomite filtration media to improve the purity of liquids during liquid filtration.

Conventional Diatomite Filtration Media

Conventional diatomite filter aids are inorganic powders possessing the intricate and porous structure of diatom frustules. Several of the leading manufacturers of commercial diatomite filter aid products are Imerys Filtration Minerals, EP Minerals, Showa Chemical Industries, Grefco Minerals and Calgon Carbon (CECA). Diatomite products are produced to meet certain size exclusion or clarity targets of customers. It has been shown through experience that the liquid clarity/size exclusion performance of diatomite products is often correlated with the permeability of the diatomite product. Permeability, measured in Darcy units, is a measure of the flow of liquid through a standard amount of filter cake under standard conditions, as is known to those of ordinary skill in the art. Three broad descriptive terms for the type of diatomite filter aid, based on the manufacturing technique employed, are commonly used and include: natural (non-calcined), straight-calcined (calcined without the addition of a flux) and flux-calcined (calcined in the presence of a flux, such as soda ash). Table 1 lists selected chemical and physical properties, including the centrifuged wet density (CWD) and the silica specific volume (SSV), of a range of exemplary conventional natural, straight-calcined and flux-calcined diatomite filter aid products/media from three of the major global diatomite producers, EP Minerals LLC, Showa Chemical Company and Imerys Filtration Minerals. Silica specific volume is a ratio of the silica content to the centrifuged wet density.

TABLE 1

Typical Physical and Chemical Properties of Exemplary Conventional Commercial Diatomite Filter Aids

| Category | Perm (Darcy) | CWD (g/ml) | $SiO_2$ (wt %) | $Al_2O_3$ (wt %) | $Fe_2O_3$ (wt %) | SSV |
|---|---|---|---|---|---|---|
| Natural | | | | | | |
| Celite FilterCel[1] | 0.07 | 0.289 | 89.0 | 3.3 | 1.4 | 3.1 |
| CelaBrew-1[2] | 0.09 | 0.401 | 92.6 | 3.8 | 1.6 | 2.3 |
| Celatom FN-2[2] | 0.06 | 0.340 | 89.2 | 4.0 | 1.5 | 2.6 |
| Celite S[1] | 0.04 | 0.244 | 91.1 | 5.4 | 1.8 | 3.7 |
| Straight-Calcined | | | | | | |
| Standard SuperCel[1] | 0.3 | 0.305 | 91.1 | 4.0 | 1.3 | 3.0 |
| Celite 3Z[1] | 0.5 | 0.305 | 92.0 | 3.3 | 1.3 | 3.0 |
| Celatom FP-3[2] | 0.2 | 0.369 | 92.6 | 3.8 | 1.6 | 2.5 |
| Celatom FP-6[2] | 0.5 | 0.353 | 92.6 | 3.8 | 1.6 | 2.6 |
| Radiolite 300[3] | 0.2 | 0.380 | 92.0 | 4.2 | 1.7 | 2.4 |
| Flux-Calcined | | | | | | |
| Celatom FW-12[2] | 1.0 | 0.320 | 89.0 | 4.1 | 1.5 | 2.8 |
| Celatom FW-60[2] | 5.0 | 0.304 | 89.0 | 4.1 | 1.5 | 2.9 |
| Hyflo SuperCel[1] | 1.4 | 0.320 | 91.5 | 1.0 | 1.5 | 2.9 |
| Celite 545[1] | 4.2 | 0.336 | 91.5 | 1.0 | 1.5 | 2.7 |
| Radiolite 600[3] | 1.2 | 0.360 | 90.4 | 3.1 | 1.7 | 2.5 |
| Radiolite 900S[3] | 5.0 | 0.330 | 90.5 | 3.3 | 1.7 | 2.7 |

[1]Celite Corporation technical data sheet
[2]EP Minerals technical data sheet
[3]Showa Chemicals Industry technical data sheet The silica content of all the product categories (natural, straight-calcined, flux-calcined) of the exemplary conventional diatomite filtration media averages around 90.0 wt % $SiO_2$, whereas alumina ($Al_2O_3$) is in the range of 1.0 wt % to 5.4 wt % and iron oxide ($Fe_2O_3$) is in the range of 1.3 wt % to 1.8 wt %. In general, the centrifuged wet density of the products is in the range of 0.29 g/ml (18.0 lb/ft$^3$) to 0.40 g/ml (25.0 lb/ft$^3$) and the silica specific volume ranges from 2.3 to 3.1 with the exception of Celite S, a natural product, which has a silica specific volume of 3.7.

In conventional diatomite filter aid manufacturing, the typical centrifuged wet density of the natural ore used as calcination feed is between 0.272 g/ml (17.0 lb/ft$^3$) and 0.417 g/ml (26.0 lb/ft$^3$) and the final product after calcination and classification may often have a higher centrifuged wet density than the initial feed material, mainly due to degradation of the product in the dry end classification process. The typical chemical and physical properties of exemplary commercial grade natural diatomites serving as calcination feed are shown in Table 2 below.

TABLE 2

Typical Chemical and Physical Properties of Natural Diatomite Ores

| | EP Minerals[1], Lovelock, NV | EP Minerals[2], Vale, OR | Imerys Minerals[3] Lompoc, CA | Showa[4] Chemicals |
|---|---|---|---|---|
| Silica ($SiO_2$) (wt %) | 89.8 | 92.6 | 87.1 | 91.9 |
| Alumina ($Al_2O_3$) (wt %) | 3.1 | 3.8 | 3.6 | 4.1 |
| Iron Oxide ($Fe_2O_3$) (wt %) | 1.3 | 1.6 | 1.2 | 1.9 |
| Lime (CaO) (wt %) | 0.4 | 0.6 | 0.7 | 0.4 |
| Soda ($Na_2O$) (wt %) | 0.2 | 0.4 | 0.3 | 0.4 |
| Others (wt %) | 5.2 | 1.0 | 4.9 | 1.3 |
| CWD (g/ml) | 0.32 | 0.37 | 0.28 | 0.40 |
| SSV | 2.8 | 2.5 | 3.1 | 2.3 |

[1]Industrial Minerals and Rocks
[2]EP Minerals Technical Data Sheet
[3]Celite Technical Data Sheet
[4]Showa Chemical Industry Technical Data Sheet Conventional diatomite filtration media products are generally produced using dry processes involving: (1) crushing the run-of-mine diatomite ore, (2) simultaneous milling and flash drying of the crushed ore to effect de-agglomeration of the lumpy particles, (3) removing heavy mineral impurities (from the milled and dried ore of (2)) with the aid of a separator, (4) thermally sintering or calcining the beneficiated ore (the beneficiation process involving steps 1-3 above) in a rotary kiln, optionally in the presence of a fluxing agent, to significantly increase the permeability of the product, (5) subjecting the kiln discharge product to a secondary waste separation to remove heavy particles, including glass, that were generated during the thermal sintering process, and (6) classifying the powder into various size fractions to conform to the particle size distribution and permeability of the target products (see Industrial Minerals and Rocks, 7th Edition, Diatomite, p. 442). Natural diatomaceous earth filtration media products are not subjected to any form of calcination but are packaged after the waste separation process. As is known to those of ordinary skill in the art, the term "run-of-mine" means ore in its natural, unprocessed state.

High Purity Diatomite Filtration Products

For the purposes of this disclosure, we define high purity diatomite filtration media as products which have substantially lower extractable impurities than conventional diatomite products but filtration performance that is roughly similar to the filtration performance of conventional diatomite filtration media. Beginning in the late 1950's, the diatomite industry began to experiment with and introduce products which had been processed in wet processes with the intention of reducing the extractable impurities contained in the product (Bregar, G. W. 1951). These products, which were produced originally in the United States in Manville, N.J., and later in larger volumes in Japan, were composed of conventional diatomite filtration products subsequently treated through acid washing and rinsing processes. In these traditional methods of producing high purity diatomite products, the products were acid washed under atmospheric pressure following the thermal processing of the diatomite. Traditional acid washing processes were effective in reducing the extractable impurities contained at the surface of the diatomite, but, because they did not remove the mineral impurities in the diatomite, it was possible for the extractable impurities to increase when the surface of the product was abraded or broken during conveyance or through normal application handling. In addition, acid washing of the conventionally straight-calcined or flux-calcined products resulted in particle attrition and generation of fines during processing with the consequence of producing lower permeability and higher wet density material than the conventional products prior to acid washing, which in turn reduced the filtration performance of the products.

A number of companies developed and introduced conventionally acid washed products over the years, including Manville (now Imerys Filtration Minerals) (Johns Manville, 1980; Johns Manville Corp, 1979—Bradley, T. G., et al. (1979)); EP Minerals in the USA and Tsuchida Foods in Japan. Manville also introduced an intensively leached and rinsed product called, Celite Analytical Filter Aid (CAFA), which had low extractables, but conventional or high wet density. Others have also developed processes for the reduction of soluble iron in diatomite filter aids by treating the diatomite particulates with chelating agents (Austin et al. in U.S. Pat. No. 4,965,084; Ting et al. in US Publication No. 2011/0223301). Smith et al., in International Publication WO2008/024952 provided a method of reducing beer soluble iron in diatomite by steam treatment.

These high purity filtration products possess lower extractable chemistry than conventional diatomite filtration media products, but they usually have either similar, or, sometimes, inferior filtration properties, such as low silica specific volume, due to the increase in centrifuged wet density of the product during the acid washing process. Typical properties of Celite acid washed filter aids and EP Minerals' PurifiDE® acid washed filter aids, a high purity diatomite filtration media, are shown in Table 3.

TABLE 3

Typical Physical and Chemical Properties of Commercial High Purity Diatomite Filter Aids

| Products/Media | Perm[1] (Darcy) | CWD[2] (g/ml) | SiO$_2$ (wt %) | Cond.[3] (μS/cm) | SSV[4] |
|---|---|---|---|---|---|
| AW Celite FilterCel | 0.1 | 0.330 | 90.0 | ≤20 | 2.7 |
| AW Celite SSC | 0.3 | 0.330 | 92.6 | ≤20 | 2.8 |
| AW Celite 512 | 0.4 | 0.330 | 92.6 | ≤20 | 2.8 |
| AW Celite Hyflo SC | 1.0 | 0.330 | 89.4 | ≤20 | 2.7 |
| AW Celite 503 | 1.6 | 0.330 | 92.5 | ≤20 | 2.8 |
| AW Celite 535 | 3.0 | 0.330 | 92.5 | ≤20 | 2.8 |
| AW Celite 545 | 4.0 | 0.330 | 92.5 | ≤20 | 2.8 |
| PurifiDE AW3 | 0.3 | 0.370 | 93.6 | ≤20 | 2.5 |
| PurifiDE AW12 | 1.2 | 0.337 | 90.0 | ≤20 | 2.7 |
| PurifiDE AW20 | 2.0 | 0.320 | 91.5 | ≤20 | 2.9 |
| CAFA[5] | 0.3 | 0.290 | 97.5 | ≤20 | 3.4 |

[1]Permeability
[2]Centrifuged Wet Density
[3]Conductivity of 10 wt % slurry
[4]Silica Specific Volume
[5]Celite Analytical Filter Aid As indicated in Table 3, the conductivity of a 10% slurry of the diatomite product is one of the properties that differentiates the high purity acid washed filter aid products from the conventional products. High purity acid washed filter aids have maximum conductivity in the range of 15-20 μS/cm versus that of the conventional products of 70-200 μS/cm, with lower conductivity indicating higher purity. There is a small increase in the silica (SiO$_2$) content of the product during the acid washing purification process but the reduction in value of the centrifuged wet density of the material is significant enough to lower the value of the silica specific volume of the purified product.

The typical process for the production of high purity acid washed filter aids is shown in FIG. 1. For the purpose of this disclosure, a conventional filter aid is a diatomite filter aid made by following the established method of drying, milling, dry waste separation, calcination, dry classification and packaging. The process 10 of FIG. 1 starts with a conventional filter aid diatomaceous earth as feed material and it is a common practice to use a feed material which has a slightly higher permeability than that of the target product since there is typically a loss in permeability after the purification process. If possible, the feed material is selected in block 20 such that the centrifuged wet density is also lower than that of the target product since there is typically an increase in the centrifuged wet density of the final purified product. In block 30, a slurry concentration of 10-15 wt % solids is prepared. In block 40, the slurry is acid treated in a non-metallic tank by adding a mineral acid to provide a slurry acidity of 0.1 M-0.2 M. The most common mineral acid used in the Americas is sulfuric acid but it is not uncommon to see hydrochloric acid usage in Japan. In some few cases, citric acid is also used in the acid washing process to chelate metal ions to make them insoluble. In block 40, the slurry is heated to close to boiling for about an hour. In block 50, the hot acid slurry is dewatered and washed to obtain a filter cake which provides a conductivity of 20 μS/cm or lower for a 10 wt % slurry. In block 60, the final product is dried using a flash dryer or tray dryer.

High Purity, High Performance Products

U.S. Pat. Nos. 5,656,568 and 6,653,255 (collectively, "Shiuh, et al.) provided a thorough review of the prior art and disclosed improved purified diatomite products and introduced the concepts of high purity, high performance filtration media and a new measure for characterizing diatomite filtration media, called silica specific volume (SSV), which is a ratio of the silica content to the centrifuged wet density (CWD). Silica specific volume is often a good predictor of the relative filtration performance that one can expect from diatomite filtration media.

Shiuh et al. teach a method of separating the impurities found in conventional diatomite ores through froth flotation prior to the thermal processing of the diatomite. This has the effect of increasing the silica specific volume of the diatomite and improving the purity and the filtration performance of the product. The flotation product is further purified through acid treatment and rinsing at atmospheric pressure prior to thermal treatment of the material by calcination. This process approach improves the silica specific volume but does not significantly improve the extractable properties of the product since metallic ions tend to migrate to the surface of diatomite particles during the calcination process. Flux-calcined products, especially, will show high conductivity and high extractable sodium because the soda ash fluxing agent used in the last process step of calcination will be readily available to be washed out of the surface of the product particles. Shiuh et al. disclosed a number of product properties for high purity, high performance diatomite, which are summarized in Table 4A. The permeability of the products disclosed through the three examples in the Shiuh et al. patents (U.S. Pat. Nos. 5,656,568 and 6,653,255) was 300 to 1200 millidarcies, as noted in Table 4A below. No permeability was disclosed for the non-calcined product of example 1 in Shiuh et al.

TABLE 4A

Properties of High Purity, High Performance Diatomite Filter Aids (Shiuh et al.)

| Product Category | Permeability (Darcy) | CWD (g/ml) | $SiO_2$ (wt %) | $Al_2O_3$ (wt %) | $Fe_2O_3$ (wt %) | $Na_2O$ (wt %) | SSV |
|---|---|---|---|---|---|---|---|
| Natural (Shiuh et al. example 1) | n/a[1] | 0.27 | 99.1 | 0.3 | 0.2 | — | 3.7 |
| Straight-Calcined (Shiuh et al. example 2) | 0.3 | 0.21 | 99.6 | 0.3 | 0.1 | — | 4.7 |
| Flux-Calcined (Shiuh et al. example 3) | 1.2 | 0.16 | 96.8 | 0.4 | 0.1 | 1.5 | 6.1 |

[1]not available

The Advanced Minerals Corporation subsidiary of World Minerals® (now Imerys Filtration and Additives) introduced several high purity, high performance products with the trademark Celpure® which in some cases fall within some of the characteristic ranges taught by Shiuh, et al. These products have also been available in the permeability range of 25 millidarcies to 1200 millidarcies. The properties of the products are given in Table 4B below.

The silica contents of the Celpure products are lower than the silica content of the products taught by Shiuh et al., and the alumina and iron oxide levels of the Celpure products are significantly higher than those of the products taught by Shiuh et al. The Celpure products also, in most cases have equal or lower silica specific volumes than the products taught by Shiuh et al.

In summary, the products taught by Shiuh et al. generally have superior bulk chemistries and superior filtration performance relative to Celpure products, but Celpure products have superior extractable chemistry.

Taniguchi, one of the inventors of the Shiuh et al patents, discloses diatomite products possessing high silica specific volumes in international application PCT/US2014/067873. Most of the disclosures of Taniguchi appear to have already been in the public domain through Shiuh et al, the Celpure products and literature and data sheets published by Imerys, its subsidiaries and its distributors. Taniguchi does not teach the use of lacustrine diatomite in the production of high performance or ultra-high performance or ultra-high purity diatomite products.

TABLE 4B

Typical Properties of High Purity, High Performance Diatomite Filter Aids - Celpure Products

| Product | Typical Permeability (mDarcy) | CWD (g/ml) | $SiO_2$ (wt %) | $Al_2O_3$ (wt %) | $Fe_2O_3$ (wt %) | $Na_2O$ (wt %) | SSV | EMF (ppm) |
|---|---|---|---|---|---|---|---|---|
| Celpure 25 | 25 | 0.253 | 96.61 | 1.85 | 0.47 | — | 3.8 | 23 |
| Celpure 65 | 65 | 0.271 | 97.51 | 1.34 | 0.31 | — | 3.6 | 19 |
| Celpure 100 | 100 | 0.250 | 97.94 | 1.15 | 0.19 | — | 3.9 | 17 |
| Celpure 300 | 300 | 0.256 | 97.65 | 1.27 | 0.23 | — | 3.8 | 14 |
| Celpure 1000 | 1000 | 0.213 | 95.94 | 1.47 | 0.32 | 1.9 | 4.5 | 9 |

Most of the beneficiation work involving high purity, high performance diatomite has been carried out using wet physical separation processes like attrition scrubbing, hydrocycloning, dispersion, centrifugation, flotation etc. to liberate and separate clay and heavy mineral impurities like chert, quartz, sand etc. (Anastasios, P. K., 1971; Shiuh et al.). Imerys' Celpure manufacturing facility in Lompoc, Calif., USA beneficiates diatomaceous earth through use of attrition scrubbing, hydrocycloning and reverse flotation (Santa Barbara County APCD, draft permit to operate No. 5840-R5 Part II, November 2015). The drawback to these physical separation processes is that they can be inefficient in the selectivity of the impurities. In the production of a high quality product, as in the case of the Celpure® process and also as taught by Shiuh et al., the yield is compromised. FIG. 2A illustrates the process of Shiuh et al. FIG. 2B illustrates the Celpure plant process (Santa Barbara County APCD, draft permit to operate No. 5840-R5 Part II, November 2015). A side-by-side comparison of FIGS. 2A and 2B shows the differences in the process flow diagrams depicting the process by Shiuh et al. (FIG. 2A) and the Celpure plant (FIG. 2B).

The high purity, high performance products taught by Shiuh et al. and the commercially available Celpure products have one common source of diatomaceous earth crude ore. The ores were (and are) sourced from Imerys' diatomite mining operations located in Lompoc, Calif. The Lompoc deposit has been mined continuously for over 120 years and is one of the few marine diatomite deposits mined commercially for the production of filtration media. Marine deposits, deposits resulting from the skeletal remains of salt water diatoms, are known to contain frustules from a large number of diatom genera and species, and, as a result, filtration products produced from marine diatomite contain a wide variety of diatom shapes. For example FIG. 4 shows a scanning electron micrograph (SEM) of an exemplary sample of Celpure (in this case Celpure 65), an uncalcined diatomite product from Imerys produced from the marine diatomite of Lompac, Calif.; as can be seen in the SEM of FIG. 4, the exemplary marine diatomite of Celpure 65 contains multiple genera and species of marine diatoms. All of the high purity, high performance diatomite filtration products of the prior art are produced from marine diatomite and, as a result, one of ordinary skill in the art understands that these products do not possess a dominant diatom frustule type.

The process by Shiuh et al is completed with a calcination unit operation which tends to reduce the centrifuged wet density of the final product and therefore provides for a high silica specific volume. The final product in the Celpure plant process is obtained by acid washing the calcined product and then drying. Acid washing reduces the centrifuged wet density and therefore provides for a product with reduced silica specific volume. However, one of ordinary skill in the art will recognize that the extractable impurities of the Celpure plant products will be much lower (extractable chemistry will be purer) than those of the products taught by Shiuh et al. because the acid washing step occurs after the calcination unit operation.

SUMMARY

In accordance with one aspect of the disclosure, a filtration product is disclosed. The product comprises diatomaceous earth. The diatomaceous earth has an intricate and porous structure of diatomite. The diatomaceous may also have an iron oxide content that is less than or equal to 0.09% and greater than or equal to a non-detectable level, and a silica specific volume that is in a range of 4.1 to 6.1.

In an embodiment, the diatomaceous earth may further have a permeability in a range of 10 millidarcies to 1500 millidarcies and the silica specific volume may be in a range of 4.9 to 6.1.

In an embodiment, the diatomaceous earth may further have a permeability in a range of greater than 1500 millidarcies to 3750 millidarcies.

In an embodiment, the diatomaceous earth may be flux-calcined and may further have a permeability in a range of 150 millidarcies to 1500 millidarcies, and may have a total alkali metals oxide content of less than 1.1 wt %.

In an embodiment, the diatomaceous earth may be flux-calcined and may further have a permeability in a range of greater than 1500 millidarcies to 3750 millidarcies and may have a total alkali metals oxide content of less than 2.2 wt %.

In an embodiment, the diatomaceous earth may further have a permeability in a range of 150 millidarcies to 1500 millidarcies, and a stoichiometric ratio of sodium oxide to aluminum oxide, in percentage form, in a range of 50% to 200%. In a refinement the sodium oxide may be $Na_2O$ and the aluminum oxide may be $Al_2O_3$.

In an embodiment, the diatomaceous earth may have a permeability in a range of 1500 to 3750 millidarcies, and a stoichiometric ratio of sodium oxide to aluminum oxide, in percentage form, in a range of 100% to 350%. In a refinement the sodium oxide may be $Na_2O$ and the aluminum oxide may be $Al_2O_3$.

In an embodiment, the diatomaceous earth may further have an ASBC soluble iron content that is less than 0.1 mg Fe/kg.

In an embodiment, the diatomaceous earth may further have an ASBC soluble aluminum content of less than 1 mg Al/kg.

In an embodiment, the diatomaceous earth may further have an ASBC soluble calcium content of less than 1 mg Ca/kg.

In an embodiment, the diatomaceous earth may further have an EBC extractable iron content in a range of 0.5 ppm to 2 ppm.

In an embodiment, the diatomaceous earth may further have an EBC extractable aluminum content in a range of less than 1.5 ppm to below a limit of detection.

In an embodiment, the diatomaceous earth may further have an EBC extractable calcium content of less than 2.5 ppm.

In an embodiment, the diatomaceous earth may further have an Extractable Metals Factor (EMF) of 2 to 5 ppm.

In accordance with another aspect of the disclosure, a filtration product is disclosed. The product comprises diatomaceous earth. The diatomaceous earth has an intricate and porous structure of diatomite, and may have a silica specific volume in a range of 4.1 to 6.1, and a mole oxide ratio, in percentage form, of iron oxide to aluminum oxide of less than 9%.

In an embodiment, the diatomaceous earth may further have a permeability in a range of 10 millidarcies to 1500 millidarcies and the silica specific volume may be in a range of 4.9 to 6.1.

In an embodiment, the diatomaceous earth may further have a permeability in a range of greater than 1500 millidarcies to 3750 millidarcies.

In an embodiment, the diatomaceous earth may be flux-calcined and may further have a permeability in a range of 150 millidarcies to 1500 millidarcies, and may have a total alkali metals oxide content of less than 1.1 wt %.

In an embodiment, the diatomaceous earth may be flux-calcined and may further have a permeability in a range of greater than 1500 millidarcies to 3750 millidarcies and may have a total alkali metals oxide content of less than 2.2 wt %.

In an embodiment, the diatomaceous earth may further have a permeability in a range of 150 millidarcies to 1500 millidarcies, and a stoichiometric ratio of sodium oxide to aluminum oxide, in percentage form, in a range of 50% to 200%. In a refinement the sodium oxide may be $Na_2O$ and the aluminum oxide may be $Al_2O_3$.

In an embodiment, the diatomaceous earth may have a permeability in a range of 1500 to 3750 millidarcies, and a stoichiometric ratio of sodium oxide to aluminum oxide, in percentage form, in a range of 100% to 350%. In a refinement the sodium oxide may be $Na_2O$ and the aluminum oxide may be $Al_2O_3$.

In an embodiment, the diatomaceous earth may further have an ASBC soluble iron content that is less than 0.1 mg Fe/kg.

In an embodiment, the diatomaceous earth may further have an ASBC soluble aluminum content of less than 1 mg Al/kg.

In an embodiment, the diatomaceous earth may further have an ASBC soluble calcium content of less than 1 mg Ca/kg.

In an embodiment, the diatomaceous earth may further have an EBC extractable iron content in a range of 0.5 ppm to 2 ppm.

In an embodiment, the diatomaceous earth may further have an EBC extractable aluminum content in a range of less than 1.5 ppm to below a limit of detection.

In an embodiment, the diatomaceous earth may further have an EBC extractable calcium content of less than 2.5 ppm.

In an embodiment, the diatomaceous earth may further have an EMF of 2 to 5 ppm.

In accordance with another aspect of the disclosure, a diatomaceous earth product is disclosed. The product comprises diatomaceous earth. The diatomaceous earth may have: (i) a silica specific volume in a range of greater than 3.8 to 6.0; and (ii) a total alkali oxide content of less than 1.1 wt % when a permeability of the diatomaceous earth is 150 millidarcies to 1500 millidarcies, or a total alkali oxide content in a range of 1.1 wt % to 2.2 wt % when the permeability of the diatomaceous earth is in a range of greater than 1500 millidarcies to 3750 millidarcies.

In an embodiment, the diatomaceous earth may have a permeability of 150 millidarcies to 1500 millidarcies, and a stoichiometric ratio of sodium oxide to aluminum oxide in a range of 50% to 200%. In a refinement the sodium oxide may be $Na_2O$ and the aluminum oxide may be $Al_2O_3$.

In an embodiment, the diatomaceous earth may have a permeability in a range of greater than 1500 to 3750 millidarcies, and a stoichiometric ratio of sodium oxide to aluminum oxide in a range of 100% to 350%. In a refinement the sodium oxide may be $Na_2O$ and the aluminum oxide may be $Al_2O_3$.

In an embodiment, the diatomaceous earth may further has an ASBC soluble iron that is below a detection limit of 0.1 mg Fe/kg.

In an embodiment, the diatomaceous earth may further have an ASBC soluble aluminum content of less than 1 mg Al/kg.

In an embodiment, the diatomaceous earth may further have an ASBC soluble calcium content of less than 1 mg Ca/kg.

In an embodiment, the diatomaceous earth may further have an EBC extractable iron content of 0.5 ppm to 2 ppm.

In an embodiment, the diatomaceous earth may further have an EBC extractable aluminum content of less than 1.5 ppm to below a limit of detection.

In an embodiment, the diatomaceous earth may further have an EBC extractable calcium content of less than 2.5 ppm.

In an embodiment, the diatomaceous earth may have a permeability of 150 millidarcies to 1500 millidarcies and a silica specific volume in a range of 4.9 to 6.0.

In an embodiment, the diatomaceous earth may have a permeability in a range of greater than 1500 millidarcies to 3750 millidarcies, and a silica specific volume in a range of 4.1 to 6.0.

In an embodiment, the diatomaceous earth may have a permeability in a range of 150 millidarcies to 750 millidarcies, and an extractable metals factor in a range of 2 to 4 ppm.

In an embodiment, the diatomaceous earth may have a permeability in a range of 150 millidarcies to 750 millidarcies, and an extractable metals factor in a range of 6 to 11 ppm.

In an embodiment, the diatomaceous earth may have a permeability in a range of 150 millidarcies to 750 millidarcies, and an extractable metals factor in a range of 2 to 5 ppm.

In an embodiment, the diatomaceous earth may have a permeability greater than 1500 millidarcies to 3750 millidarcies, and an extractable metals factor in a range of 2 to 7 ppm.

In accordance with another aspect of the disclosure, a method of manufacturing ultra-high purity, ultra-high performance diatomite filtration media is disclosed. The method comprises selecting a crude diatomaceous earth run-of-mine feed ore, the feed ore having at least a silica content of 80 wt % (w/w) $SiO_2$ to about 99 wt % on an ignited basis and a maximum centrifuged wet density of 0.256 g/ml after milling. The method further comprises pressure leaching the feed ore with an inorganic acid to produce a leached ore, and rinsing the leached ore to produce a rinsed leached ore. The method may further comprise calcining the rinsed leached ore to produce a calcined media, the calcining within a temperature range of about 871° C. to about 1150° C. in either (a) the absence of a fluxing agent, or (b) the presence of 0.6 wt % to 4.0 wt % alkali oxide fluxing agent.

In an embodiment, the method may further comprise acid leaching the calcined media. In a refinement, an acid concentration used for the acid leaching of the calcined media is in a range of 0.05 mole/liter to 1.0 mole/liter. In another refinement, the acid leaching of the calcined media utilizes an acid that comprises (i) inorganic acid, or (ii) organic acid and inorganic acid. In a further refinement, the inorganic acid may include a mineral acid. In yet a further refinement, the mineral acid may include sulfuric acid, nitric acid, hydrofluoric acid, hydrochloric acid, perchloric acid or mixtures thereof. In another refinement, the organic acid may include citric acid, ethylenediaminetetraacetic acid, glutamic acid, malate or mixtures thereof.

In accordance with another aspect of the disclosure, a filtration product is disclosed. The product comprises diatomaceous earth that includes a diatom frustule population. The diatomaceous earth has an intricate and porous structure of diatomite and may have a silica specific volume in a range of greater than 3.9 to 6.1, wherein the diatomaceous earth is from ore that is sourced from a lacustrine diatomite deposit.

In an embodiment, the diatom frustule population may contain a plurality of diatom frustules derived from diatoms of the genera *Cymbella* or *Stephanodiscus* or *Aulacoseira* (sometimes called *Melosira*).

In an embodiment, the diatomaceous earth may further have a permeability in a range of 10 millidarcies to 1500 millidarcies, wherein the silica specific volume may be in a range of 4.9 to 6.1.

In an embodiment, the diatomaceous earth may further have a permeability in a range of greater than 1500 millidarcies to 3750 millidarcies.

In an embodiment, the diatomaceous earth may be flux-calcined and may further have a permeability in a range of 150 millidarcies to 1500 millidarcies, and a total alkali metals oxide content of less than 1.1 wt %.

In an embodiment, the diatomaceous earth may be flux-calcined and may further have a permeability in a range of greater than 1500 millidarcies to 3750 millidarcies, and a total alkali metals oxide content of less than 2.2 wt %.

In an embodiment, the diatomaceous earth may further have a permeability in a range of 150 millidarcies to 1500 millidarcies, and a stoichiometric ratio of sodium oxide to aluminum oxide, in percentage form, in a range of 50% to 200%. In a refinement the sodium oxide may be $Na_2O$ and the aluminum oxide may be $Al_2O_3$.

In an embodiment, the diatomaceous earth may further have a permeability in a range of 1500 to 3750 millidarcies, and a stoichiometric ratio of sodium oxide to aluminum oxide, in percentage form, in a range of 100% to 350%. In a refinement the sodium oxide may be $Na_2O$ and the aluminum oxide may be $Al_2O_3$.

In an embodiment, the diatomaceous earth may further have an ASBC soluble iron content that is less than 0.1 mg Fe/kg.

In an embodiment, the diatomaceous earth may further have an ASBC soluble aluminum content of less than 1 mg Al/kg.

In an embodiment, the diatomaceous earth may further have an ASBC soluble calcium content of less than 1 mg Ca/kg.

In an embodiment, the diatomaceous earth may further have an EBC extractable iron content in a range of 0.5 ppm to 2 ppm.

In an embodiment, the diatomaceous earth may further have an EBC extractable aluminum content in a range of less than 1.5 ppm to below a limit of detection.

In an embodiment, the diatomaceous earth may further have an EBC extractable calcium content of less than 2.5 ppm.

In an embodiment, the diatomaceous earth may further have an Extractable Metals Factor (EMF) of 2 to 5 ppm.

DETAILED DESCRIPTION

Fenon Ultra-High Purity, Ultra-High Performance Products

Figure 1:
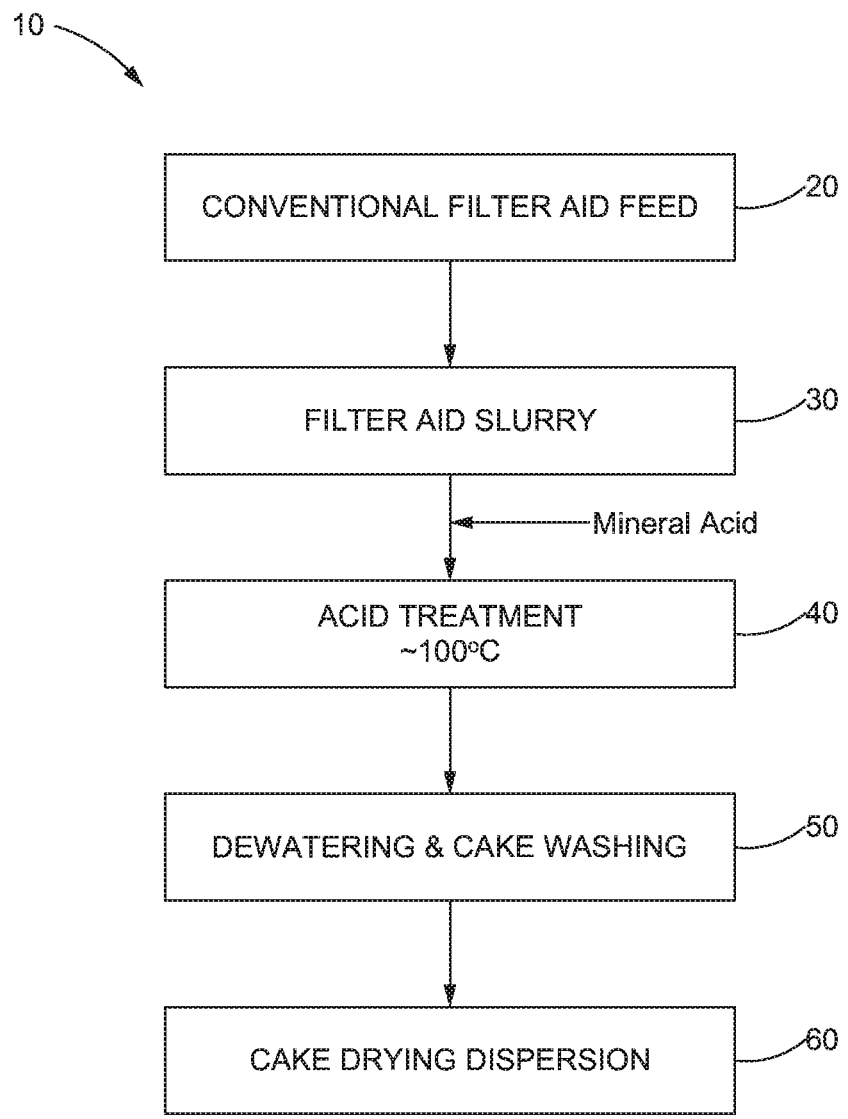
FIG. 1 illustrates a typical acid washing process flow diagram.
Figure 2A:
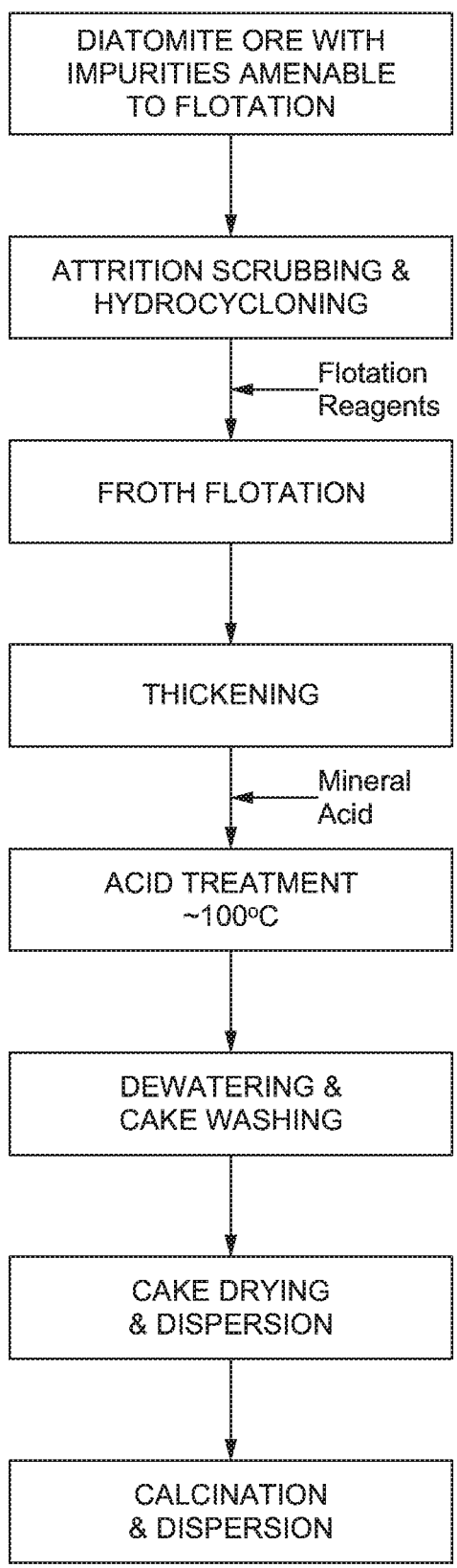
FIG. 2A illustrates a process flow diagram for high purity, high performance diatomite process of Shiuh et al.
Figure 2B:
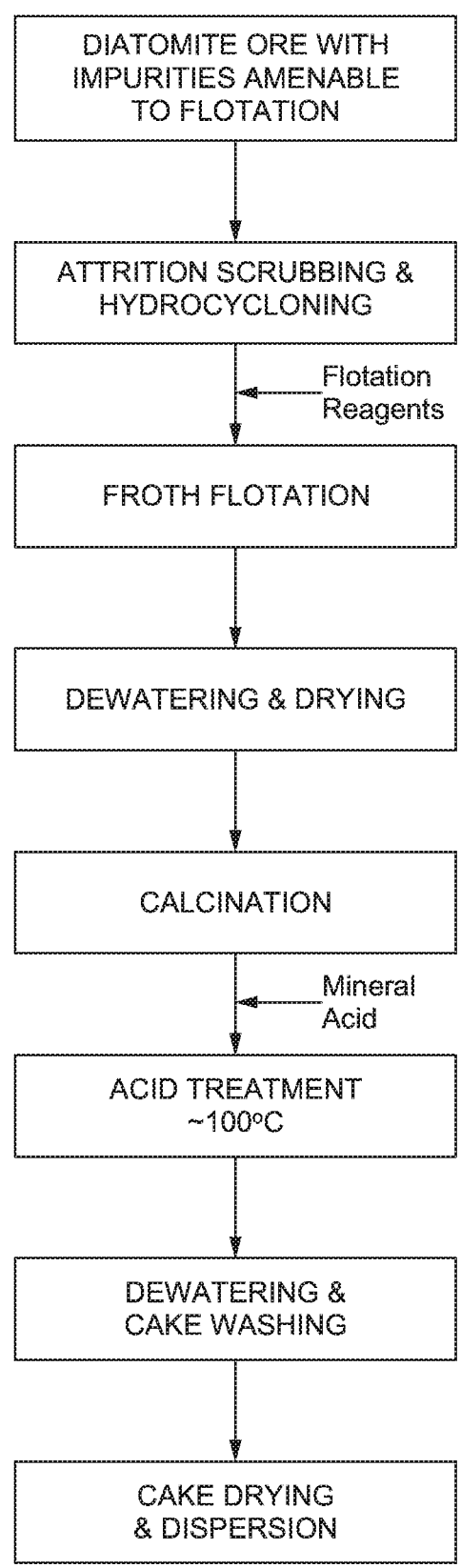
FIG. 2B illustrates a process flow diagram for high purity, high performance diatomite process of the Celpure plant.

For the purposes of this disclosure, we define Ultra-High Purity, Ultra-High Performance diatomite filtration media as products that have both lower extractable impurities than, and at least one superior physical property relative to, Imerys Filtration and Additives' currently commercially available Celpure® diatomite filtration media (listed in Table 4B), which are the only high purity, high performance diatomite filtration media that are currently commercially available. Superior physical properties include, but are not limited to, lower CWD or higher SSV. Fenon (Ultra-High Purity, Ultra-High Performance) diatomite filtration products/media of the present disclosure have purer bulk chemistry and lower extractable impurities than all Celpure products of Table 4B and all of the products taught by Shiuh, et al., as well as superior physical properties than all Celpure products of Table 4B and all but one of the products disclosed by Shiuh et al.

The Fenon products/media disclosed herein provide, at a minimum, for a greater range of permeability options in this class of products, from 31 millidarcies to 3537 millidarcies permeability including higher purity in terms of lower extractable metals and higher purity in terms of the higher silica content and purer bulk chemistry. The permeabilities and other properties of the exemplary samples disclosed in the present disclosure are shown in Tables 5 and 6. Table 5 shows the unique physical and chemical properties of some exemplary slow product examples of the present invention.

The permeabilities of non-calcined (natural) products were closely related to the natural permeability of the crude ore, as there was no thermal treatment of the material to effect agglomeration. Unlike the straight-calcined and flux-calcined products, the method of processing seems to have very little effect on the permeability of the non-calcined products. The ultra-high purity non-calcined exemplary products of the present disclosure show a minimum silica content of 97.32 wt % $SiO_2$ and bulk iron oxide content of 0.00 wt % to about 0.10 wt %. In the production of exemplary products with permeabilities greater than 136 millidarcy and less than 400 millidarcy, a small amount of flux, for example soda ash, is added in order to achieve the desired product permeability. The centrifuged wet density of these exemplary slow grade products (Table 5) are extremely low in the range of 0.162 g/ml (10.1 lb/ft$^3$) to 0.226 g/ml (14.1 lb/ft$^3$) with silica specific volumes ranging from 4.3-6.1. The extractable metal factor (EMF), which measures the sum of aluminum, iron and calcium metals extracted from the products by the European Brewery Convention (EBC) test method (as explained later herein) is very low for all the products, 5 ppm or less in all cases. For each of these products, the beer soluble iron (BSFe) is less than the detection limit (LD), the limit of detection being 0.1 ppm with the use of GFAA analytical instrument. The beer soluble aluminum (BSAl) and the beer soluble calcium (BSCa) levels are non-detectable, with the subtraction of metal in beer background giving zero results, when the American Society of Brewing Chemists (ASBC) method is used to determine the extractable chemistry.

TABLE 5

| | Properties of Exemplary Fenon (Ultra-High Purity, Ultra-High Performance) Filter Aid Products/Media (Slow Grades) | | | | |
|---|---|---|---|---|---|
| Permeability (millidarcies$^3$) | (Non-Calcined) 31-35 | 37-41 | 67-75 | 115-136 | 321-378 |
| $SiO_2$ (wt %) | 97.32-99.1 | 97.0-99.1 | 98.12-99.2 | 98.42-99.5 | 97.4-98.5 |
| $Al_2O_3$ (wt %) | 0.76-1.31 | 0.76-1.21 | 0.76-0.96 | 0.82-1.1 | 0.99-1.04 |
| $Fe_2O_3$ (wt %)$^4$ | 0.00-0.10 | 0.00 | 0.00 | 0.00 | 0.00 |
| $Na_2O$ (wt %) | 0.10-0.17 | 0.1-0.17 | 0.06-0.10 | 0.06-0.10 | 0.50-0.75 |
| $Fe_2O_3/Al_2O_3$ (% mols) | 0.9-8.4 | 0.1-0.3 | 0.1-0.3 | 0.1-0.3 | 0.1-0.3 |
| $Na_2O/Al_2O_3$ (% stoichiometry) | — | — | — | — | 79-125 |
| CWD (g/ml) | 0.162-0.215 | 0.168-0.215 | 0.168-0.226 | 0.167-0.223 | 0.163-0.204 |
| CWD (lb/ft$^3$) | 10.1-13.4 | 10.5-13.4 | 10.5-14.1 | 10.4-13.9 | 10.2-12.7 |
| SSV | 4.5-6.1 | 4.5-5.8 | 4.3-5.9 | 4.4-6.0 | 4.8-6.0 |
| EMF$^1$ (ppm) | 3.0-5.0 | 3.0-5.0 | 1.0-4.0 | 1.0-3.5 | 2.0-4.0 |
| EBC Al (ppm) | 0.5-1.5 | below LD$^2$-1.5 | below LD-0.5 | below LD-1.5 | below LD-0.5 |
| EBC Fe (ppm) | 0.5-1.0 | 0.5-1.0 | 0.5-1.0 | 0.5 | below LD-0.9 |
| EBC Ca (ppm) | 2.0-2.5 | 2.0-2.5 | 2.0-2.5 | 0.5-2.0 | 1.5-2.5 |
| ASBC Fe (mg/kg) | 0-below LD$^2$ | 0-below LD | 0-below LD | 0-below LD | 0-below LD |

TABLE 5-continued

Properties of Exemplary Fenon (Ultra-High Purity, Ultra-High Performance) Filter Aid Products/Media (Slow Grades)

| Permeability (millidarcies)[3] | (Non-Calcined) 31-35 | 37-41 | 67-75 | 115-136 | 321-378 |
|---|---|---|---|---|---|
| ASBC Al (mg/kg) | nd[3] | nd | nd | nd | nd |
| ASBC Ca (mg/kg) | nd | nd | nd | nd | nd |

[1] EMF—EBC test method Extractable Metals Factor = Σ(Al, Fe, Ca)
[2] LD—Limit of Detection (lowest level detectable) using GFAAS is 0.1 ppm (ASBC method and EBC method) or 0.1 mg soluble metal/kg; a value "below LD" is used when no soluble metal content was detected using GFAAS.
[3] nd—non-detectable values (subtraction of metal in beer background gives zero results – ASBC)
[4] Determined by XRF; lowest amount detectable by XRF is 0.001%

Table 6 shows the properties of some of the exemplary products of this disclosure that possess higher permeability. Unlike the commercial Celpure products, it is possible to produce the products of this invention as "direct run" (without the use of post-calcination classification) products which possess permeabilities higher than about 1000 millidarcies, as exemplary products with permeabilities as high as 3537 millidarcy were produced. The characteristics of these exemplary products are shown in Table 6.

TABLE 6

Properties of Fenon (Ultra-High Purity, Ultra-High Performance) Filter Aid Products/Media (Fast Grades)

| Permeability (millidarcies) | 1045-1235 | 1763-2051 | 3039-3537 |
|---|---|---|---|
| $SiO_2$ (wt %) | 96.0-97.9 | 95.5-97.5 | 95.0-96.5 |
| $Al_2O_3$ (wt %) | 0.90-1.20 | 0.9-1.2 | 1.0-1.20 |
| $Fe_2O_3$ (wt %)[5] | 0.00 | 0.00 | 0.00 |
| $Na_2O$ (wt %) | 0.6-1.0 | 1.1-1.24 | 1.6-1.9 |
| $Fe_2O_3/Al_2O_3$ (% mols) | 0.1-0.3 | 0.1-0.3 | 0.2-0.3 |
| $Na_2O/Al_2O_3$ (% stoichiometry) | 82-183 | 151-227 | 219-313 |
| CWD (g/ml) | 0.162-0.208 | 0.162-0.232 | 0.168-0.232 |
| CWD (lb/ft$^3$) | 10.1-13.0 | 10.1-14.5 | 10.5-14.5 |
| SSV | 4.6-6.0 | 4.1-6.0 | 4.1-5.7 |
| EMF[1] (ppm) | 1.0-3.8 | 2.1-4.0 | 3.0-5.0 |
| EBC Al (ppm) | below LD[3]-1.6 | below LD | 0.5-2.0 |
| EBC Fe (ppm) | below LD-1.0 | 0.7-1.0 | 0.5-1.0 |
| EBC Ca (ppm) | 1.0-1.2 | 1.4-3.0 | 2.0 |
| ASBC Fe (mg/kg)[2] | below LD | below LD | below LD |
| ASBC Al (mg/kg)[2] | nd[4] | nd | nd |
| ASBC Ca (mg/kg)[2] | nd[4] | nd | nd |

[1] EMF—Extractable Metals Factor (EBC method)
[2] Beer Soluble Metals (ASBC method)
[3] LD—Limit of Detection (lowest level detectable) using GFAAS is 0.1 ppm (ASBC method and EBC method) or 0.1 mg soluble metal/kg; a value of "below LD" is used when no soluble metal content was detected using GFAAS.
[4] nd—non-detectable values (subtraction of metal in beer background gives zero results – ASBC)
[5] Determined by XRF; lowest amount detectable by XRF is 0.001%

Methods of Preparing Fenon (Ultra-High Purity, Ultra-High Performance) Diatomite Filtration Media Unlike the processes employed by Shiuh, et al. and, apparently, in the manufacture of Celpure, the Fenon process begins with the selection of ores possessing exceptionally low centrifuged wet densities (e.g. ores having a CWD in the range of 0.128 g/ml (8.0 lb/ft$^3$) to 0.256 g/ml (16.0 lb/ft$^3$). This low density ore selection approach facilitates the production of products possessing the ultra-high filtration performance physical properties of the present invention.

Another aspect of the selection of ore for the present invention is the chemistry of the crude ore. Due to the beneficiation process disclosed below for the present invention, there is more flexibility in ore selection in terms of chemistry than in density, and there is generally more flexibility in the use of ores of various chemistries in the Fenon process than in processes used to produce the high purity and high purity, high performance products of the prior art. The beneficiation process employed in this invention is very efficient in removing the impurities in any typical diatomaceous earth ore, so the chemistry of the crude ore alone does not present a significant limitation on the ore type used. Unlike conventional diatomaceous earth processes in which the ore chemistry plays an important role in determining whether any type of ore is commercially viable, the ultra-high purity process of the present invention tolerates a wide range of ore chemistries.

Another unique aspect of the present invention is related to the beneficiation of the crude ore through the use of high pressure leaching in the presence of sulfuric or other inorganic acid(s). This process approach overcomes the shortcomings of the physical separation processes described in the prior art and beneficiated product yield is significantly higher, ranging from 70 wt % to 90 wt %, depending on the initial bulk chemistry of the crude ore feed.

The high pressure leaching approach used in the present invention is more of a chemical beneficiation process as opposed to physical beneficiation. Chemical beneficiation is very specific in terms the selectivity in removing the impurities. This selectivity results in a higher product yield relative to the yields of Shiuh et al. and Celpure. The sulfuric acid, or other inorganic acid(s), used in the process reacts effectively with all the mineral impurities in diatomaceous earth and dissolves them with little or no impact on the structure of the biogenic silica. This/these acid(s) are especially effective in the dissolution of aluminum, iron, calcium and magnesium impurities, which are the impurities found in many diatomaceous earth ores.

The chemical beneficiation process is also unique, in that it works on almost all forms of impurities in diatomaceous earth. With the use of the liquid acidic lixiviant, impurities embedded deep into the diatoms structure, whether chemically bonded to the diatoms or physically mixed with the diatoms, are readily removed by dissolution. The physical beneficiation processes of the prior art, on the other hand, are only effective when the impurities are physically bonded to the diatoms and therefore limited in its scope of application.

Another unique aspect of this process is related to the final acid treatment of the non-calcined, straight-calcined and flux-calcined products to obtain significantly lower extractable metals. The final acid treatment may be carried out using staged acid addition of an inorganic acid (for example, a mineral acid) and followed by an organic acid, such as citric acid, to chelate any residual metal solubles remaining in the product, all this done under ambient conditions.

Depending on the maximum extractable metals that may be tolerated by the product application, the final acid treatment of the product may also be carried out under pressure, above atmospheric. Acid treatment under pressure results in metal extractables that are extremely low, lower than that of any currently available product on the market and any product described in the prior art.

Figure 3:
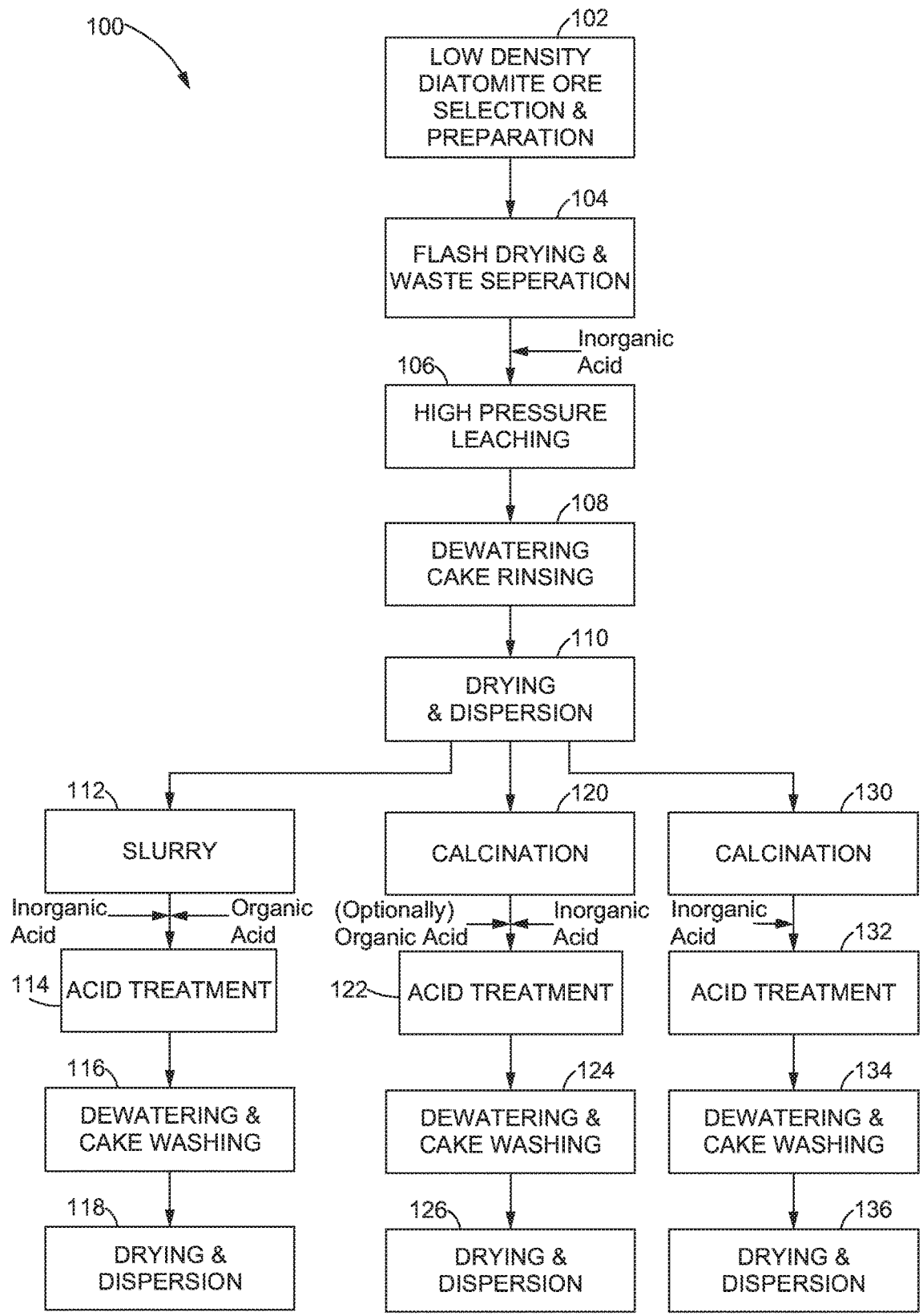
FIG. 3 illustrates a process flow diagram for the Fenon (ultra-high purity, ultra-high performance) products/media.
Figure 4:
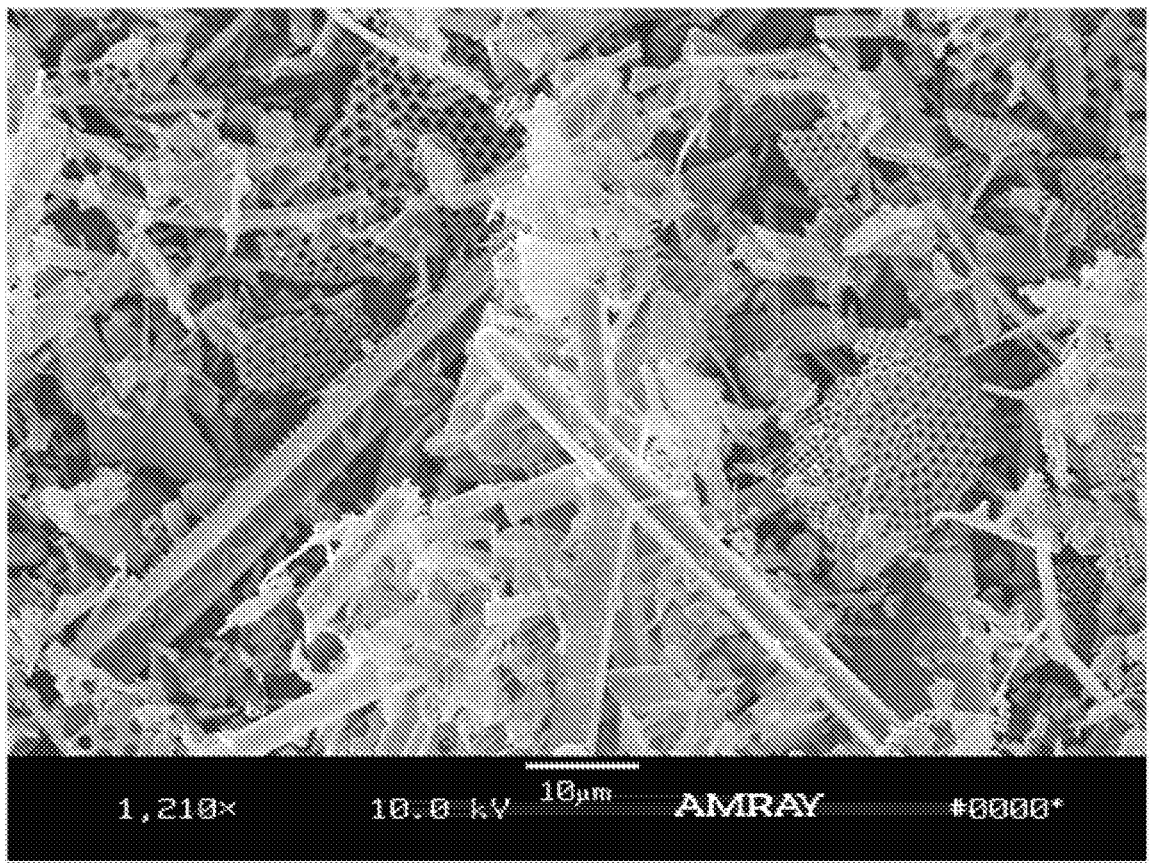
FIG. 4 is a scanning electron micrograph (SEM) of marine diatomite containing multiple genera and species of marine diatoms.

The process flow diagram for the Fenon manufacturing process 100 of the present invention is shown in FIG. 3. The initial stages of the process 100, involving low density crude ore selection and preparation, flash drying and waste separation, high pressure leaching with an inorganic acid (for example, a mineral acid) and dewatering and rinsing are common to all of the products in all of the permeability ranges disclosed herein. The specific permeability of a product is determined by the calcination temperature and whether a flux agent (for example, soda ash) is used. In the exemplary products of the present disclosure, the use of a fluxing agent was increased as the permeability of the product increased above a threshold permeability level. For the exemplary products disclosed herein, the exemplary products with permeabilities of 136 millidarcies or less did not make use of a fluxing agent and the exemplary products disclosed herein with permeabilities higher than this range did make use of a fluxing agent, such as soda ash. The unit stages after calcination (acid treatment, dewatering and cake washing, drying and dispersion) are also common to products throughout the permeability range of the present disclosure.

In Block 102, an appropriate diatomite crude ore is identified and selected based on the result of a CWD test and bulk chemistry of the ore. To identify a diatomite crude ore with the appropriate low centrifuged wet density, a representative sample of diatomite crude ore is dried and hammer-milled to pass 80 mesh size. Then, another (a second) representative sample is taken from the powder that passed through the 80 mesh size. This sample of the powder is then subjected to a centrifuged wet density test to determine if the density is in the range of 0.128 g/l (8.0 lb/ft$^3$) to 0.256 g/ml (16.0 lb/ft$^3$). The standard operating procedure for carrying out the centrifuged wet density test is described herein under the "Methods of Characterizing the Fenon (Ultra-High Purity, Ultra-High Performance) Diatomite Filtration Products/Media" section of this disclosure. Due to the specificity of the beneficiation process in removing the target impurities in the ore, there is some latitude in the desired bulk chemistry of the ore. A diatomite crude ore that is selected as a diatomite crude ore feed for the remainder of the process has: (1) a CWD in the range of 0.128 g/l to 0.256 g/l; (2) a silica content in the range of 80 wt % $SiO_2$ on an ignited basis to about 99 wt % on an ignited basis; and (3) the sum of aluminum oxide and iron oxide (e.g., $Al_2O_3+Fe_2O_3$) contents in the range of 0.5 wt % to 13 wt %.

Figure 5A:
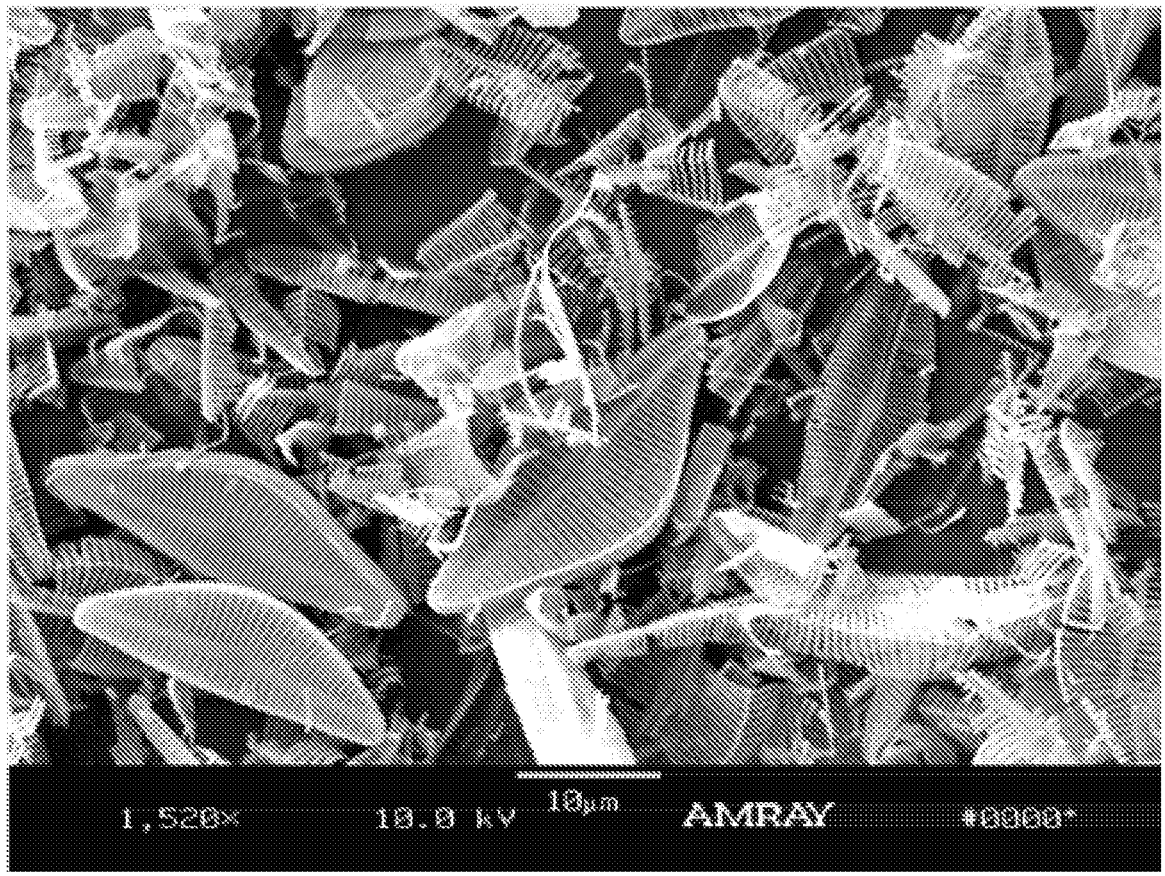
FIG. 5A is a SEM of Freshwater Diatoms—*Cymbella* genus (specifically designata species ore type A)
Figure 5B:
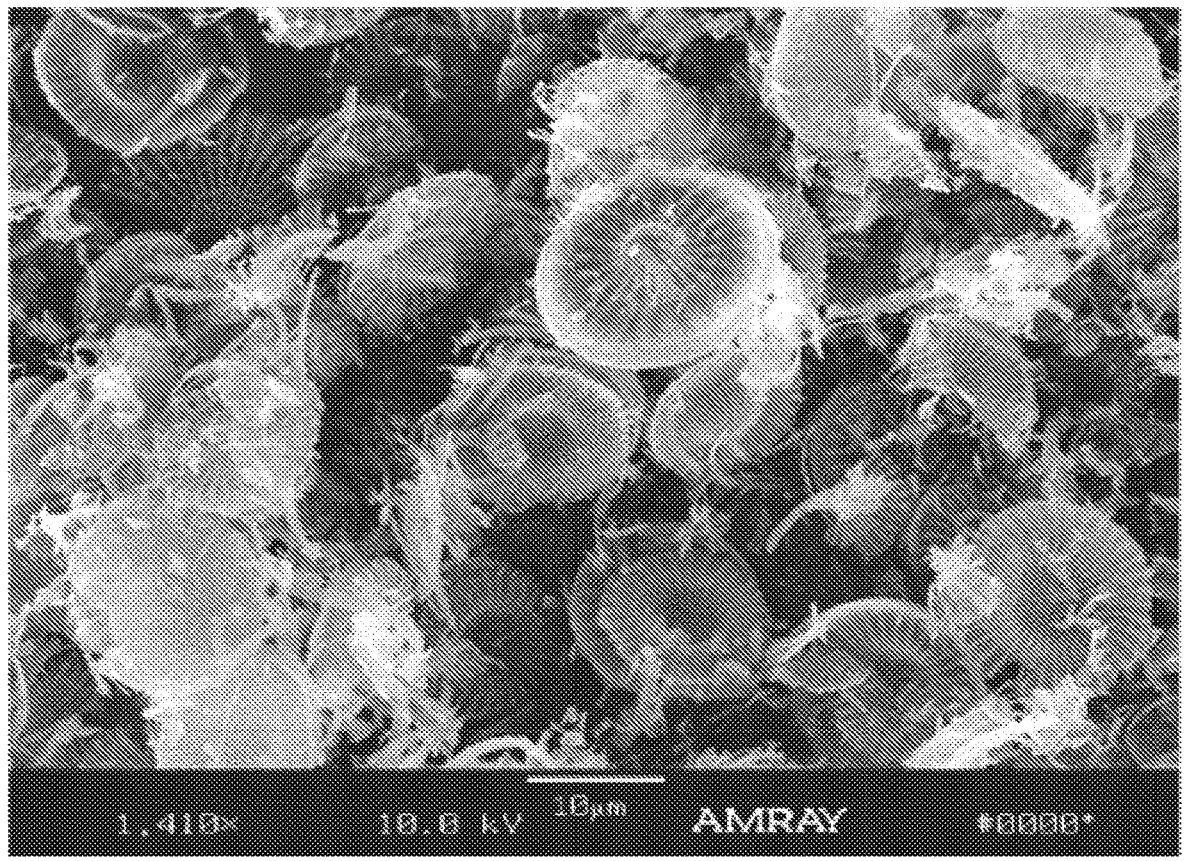
FIG. 5B is a SEM of Freshwater Diatoms—*Stephanodiscus* genus (ore type B)
Figure 5C:
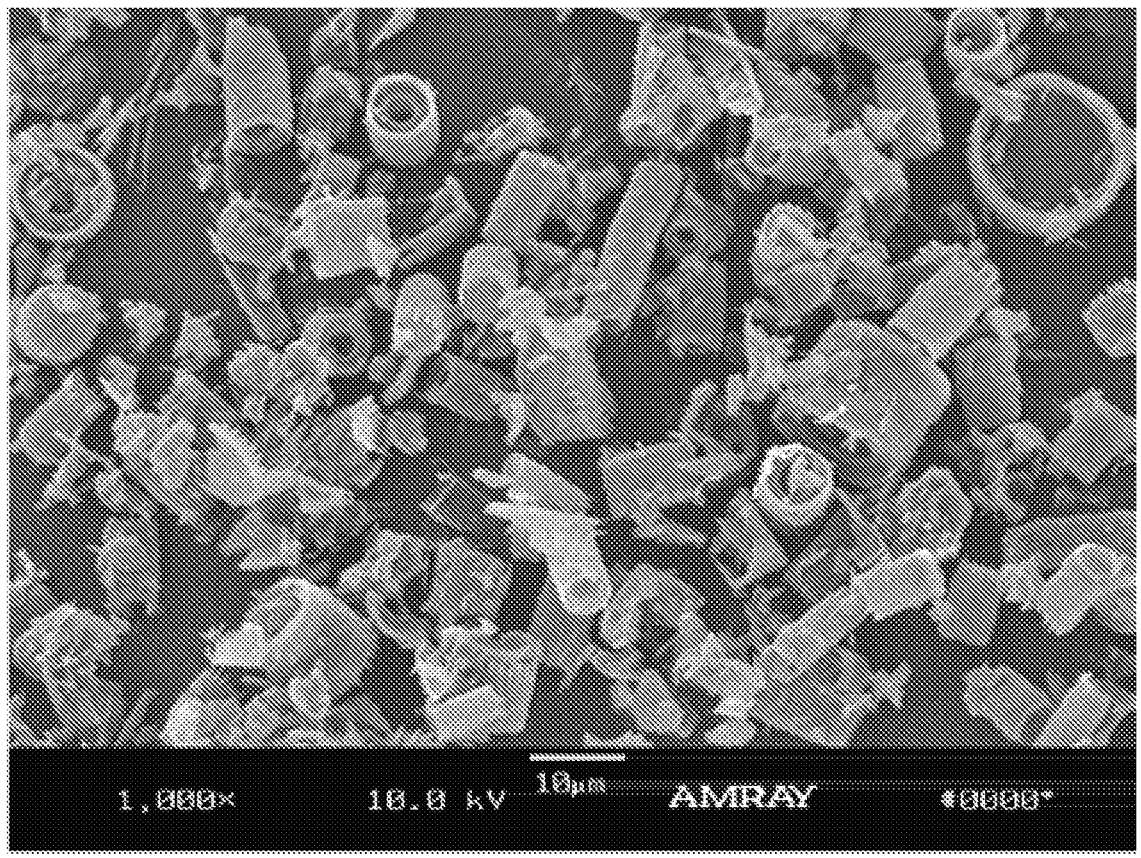
FIG. 5C is a SEM of Freshwater Diatoms—*Aulacoseira* genus (ore type C).

In contrast to the high purity, high performance products taught by Shiuh et al. and the commercially available Celpure products which are of marine origin, the products of the current disclosure are all produced from lacustrine (fresh water) diatomite. Lacustrine diatomite deposits generally contain diatoms from one to three types of diatom genera. Scanning Electron Micrographs (SEM) of three exemplary uncalcined products/media of the present disclosure are shown in FIGS. 5A, 5B and 5C. FIG. 5A depicts an exemplary product/media made from ore A. In FIG. 5A it can be seen that the dominant diatom frustules of ore A are from the genus *Cymbella* (species *designata*). FIG. 5B depicts an exemplary product/media made from ore B. In FIG. 5B it can be seen that the dominant diatom frustules of ore B are from the genus *Stephanodiscus*. FIG. 5C depicts an exemplary product/media made from ore C. In FIG. 5C it can be seen that the dominant diatom frustules of ore C are from the genus *Aulacoseira* (which is sometimes referred to as *Melosira* in the literature and prior art).

The diatomite crude ore selected is comprised of a diatom frustule population. In an embodiment, the diatom frustule population may include a plurality of diatom frustules derived from diatoms of the genera *Cymbella, Stephanodiscus* or *Aulacoseira*.

In another embodiment, the diatom frustule population may include diatom frustules derived from diatoms of the genus *Cymbella*. In a refinement, at least 70%-80% of the diatom frustules of the diatom frustule population may be derived from diatoms of the genus *Cymbella*. In another refinement, the diatoms of the genus *Cymbella* may be of the species *designata*. In a further refinement, at least 70%-80% of the diatom frustules of the diatom frustule population may be derived from diatoms of the genus *Cymbella* and species *designata*.

In another embodiment, the diatom frustule population may include diatom frustules derived from diatoms of the genus *Stephanodiscus*. In a refinement, at least 70%-80% of the diatom frustules of the diatom frustule population may be derived from the genus *Stephanodiscus*.

In another embodiment, the diatom frustule population may include diatom frustules derived from diatoms of the genus *Aulacoseira*. In a refinement, at least 70%-80% of the diatom frustules of the diatom frustule population may be derived from the genus *Aulacoseira*.

In block 104, the crude ore identified in block 102 as an appropriate crude ore feed is crushed and flash dried. To preserve the particle integrity of the crushed crude ore feed during the flash drying step, the flash dryer is configured to use an inline double cone static classifier. With this setup, the crushed crude ore feed is gently milled during the flash drying operation and any coarse particles that do not pass the particle size specification are returned to the mill through the coarse discharge of the inline double cone classifier. The resulting dried powder is subjected to dry heavy mineral impurities separation, when warranted, to remove quartz, chert, sand and other heavy foreign matter in the ore through the use of an air separator or air classifier.

In block 106, the dried powder resulting from block 104 is fed into a glass-lined pressure reactor at a slurry concentration of 10 wt % to 15 wt % solids, depending on the density of the ore, and leached at a pressure of 69 kPa to 690 kPa (10 PSI-100 PSI) above atmospheric pressure, the corresponding temperature being 120° C. to 160° C. An inorganic acid (e.g., mineral acid) is used in the pressure leaching process with a slurry acid strength of 0.1 M to 1.0 M, depending on the impurities level of the crude ore. The mineral acid may include sulfuric acid, nitric acid, hydrofluoric acid, perchloric acid or hydrochloric acid, or mixtures thereof. In an embodiment, the pressure leaching is carried out for a period of about 10 minutes to about 100 minutes. In a preferred embodiment, the leaching time may be approximately 60 minutes. After leaching, the process 100 proceeds from block 106 to block 108.

In block 108, the slurry of leached ore resulting from block 106 is dewatered through the use of a pressure filter to separate the dissolved impurities, and the resulting (diatomaceous earth) cake is rinsed to remove any residual acid.

In block 110, the moist cake is dried in a conveyor dryer (for example, at about 120° C. to less than about 5% moisture) and dispersed to obtain the resulting chemically-beneficiated natural diatomaceous earth media or product.

One of the unique aspects of this chemical beneficiation process is the combination of acid strength, higher reaction temperature and higher reaction pressure that effectively targets and dissolves all mineral waste impurities in the crude ore and consequently upgrades the silica content to greater than 98 wt % $SiO_2$. This method of beneficiating diatomaceous earth ore is more effective and more economical since the process is very selective, and losses are limited to only the unwanted mineral gangue.

Method of Preparing the Non-Calcined Fenon Products/Media of the Present Invention If ultra-high performance and ultra-high purity non-calcined products/media with ultra-low extractable chemistry are desired, the process 100 proceeds from block 110 to block 112. In block 112, the chemically beneficiated natural diatomaceous earth media or product of block 110 is again slurried into 10 wt % to 15 wt % solids to prepare it for polish leaching.

In block 114, the slurry is leached in a glass reactor using the addition of inorganic acid and organic acid for chelating any residual extractable metals. The inorganic acid may include a mineral acid. The mineral acid may include sulfuric acid, nitric acid, hydrochloric acid, or mixtures thereof. The organic acid may include citric acid, ethylenediaminetetraacetic acid, glutamic acid, malate or mixtures thereof. The aggregate inorganic acid strength used is 0.1 M to 0.2 M and the aggregate amount of organic acid introduced is 1.0 wt % solids. For example, in an embodiment in which sulfuric acid and citric acid are used, the sulfuric acid strength used is 0.1 M to 0.2 M and the amount of citric acid introduced is 1.0 wt % solids. The slurry may be polish leached for about 20 minutes to about 60 minutes. The temperature during such polish leaching may be about 80° C. to about 100° C. In a preferred embodiment, the slurry may be polish leached for a total of 1 hour at about 95° C. Alternatively, in some embodiments of the process 100, to further reduce the extractable metals content, the polish leaching of block 114 may be carried out under pressure (e.g., at 69 kPa to 690 kPa) using 0.1 M-0.5 M inorganic acid (e.g., sulfuric acid or other mineral acid) strength; in such an alternative embodiment, the amount of organic acid added remains the same, namely 1.0 wt % solids). The polishing leaching process involving the pressure treatment may be used when there is a need for extraordinarily low extractable metals in the resulting diatomaceous earth media or product.

After the process of block 114, the slurry, in block 116, is dewatered and the resulting cake is thoroughly rinsed with deionized water to ensure that the conductivity of 10 wt % slurry of the dried product is less than 20 µS/cm. The process then proceeds to block 118.

In block 118, the cake is dried (e.g., in an oven at about 120° C.) and dispersed to obtain the final non-calcined product. To preserve the integrity of the diatom particles and preserve the centrifuged wet density of the product, drying of the cake may be carried out under industrial conditions using a static dryer, typically a tray dryer.

Method of Preparing Calcined Fenon Products/Media of the Present Invention

If ultra-high performance and ultra-high purity straight-calcined or lightly flux-calcined media (or products) with ultra-low extractable chemistry and permeabilities ranging from about 10 millidarcies up to about 750 millidarcies are desired, the process 100 proceeds from block 110 to block 120 and the dried dispersed media or product from the pressure leached crude ore of block 110 is used as feed for manufacturing such calcined products. In block 120, the dried and dispersed diatomaceous earth media or product resulting from block 110 is calcined at a temperature range of 538° C. to 1204° C. (1000° F. to 2200° F.) for a period ranging from 15 minutes to 100 minutes, usually utilizing longer retention times because of the purity of the material, which increases the insulating properties of the feed and hinders sintering. The process conditions are selected such that the calcined products have permeabilities ranging from between about 10 millidarcies up to about 750 millidarcies. The appropriate temperature for the calcination operation is mostly determined by the source of the diatomaceous earth ore, as some can be sintered and agglomerated at lower temperatures than others. In most cases, non-beneficiated feed materials will sinter and agglomerate more quickly during calcination because of the presence of the natural fluxing impurities.

In some instances, it is not possible to achieve straight (flux-free) calcined product permeabilities in excess of 150 millidarcies because some ores just do not agglomerate easily during calcination. Thus, in some embodiments, a small amount of one or more fluxing agents, for example about 0.2 wt % to about 0.8 wt % (in aggregate), may be added to the feed material to enhance agglomeration and produce a lightly flux-calcined product. Calcined media/products with permeabilities in a range of greater than 150 millidarcies to 750 millidarcies may be obtained this way without significantly increasing the centrifuged wet density due to overheating. The fluxing agent may include an alkali oxide fluxing agent, a lithium oxide, potassium oxide, boron oxide and sodium oxide or mixtures thereof. For example, in an embodiment, the fluxing agent may include soda ash. In another embodiment the fluxing agent may be soda ash. Calcination may be carried out in a directly-fired kiln where the diatomaceous earth media/product makes direct contact with the flame from the kiln burner or through the use of an indirectly-fired kiln wherein the shell of the kiln is heated from the outside and the product does not make any direct contact with the burner flame and calcination is achieved through heat conduction.

Even though the calcined diatomaceous earth media/products are obtained from the calcination of the purified pressure leached feed, the extractable chemistry of some diatomaceous earth media/products thus produced may not be low enough to qualify as an ultra-low extractable metals media/product after the calcination of block 120. In order to obtain the ultra-high purity Fenon media/product that has an ultra-low amount of extractable metals, as disclosed herein, the process 100 may proceed from block 120 to block 122.

In block 122, the calcined media/product of block 120 is dispersed through a centrifugal sifter and then slurried into 10 wt % to 15 wt % solids to prepare it for polish leaching. The slurry may be (acid) leached in a glass reactor using (i) inorganic acid (e.g. sulfuric acid or other mineral acid); or (ii) a combination of inorganic acid and organic acid. For those products to which a fluxing agent (e.g. soda ash) has been added, only inorganic acid may be used for the polish leaching of block 122. The inorganic acid may include a mineral acid. The mineral acid may include sulfuric acid, nitric acid, hydrochloric acid, or mixtures thereof. The organic acid may include citric acid, ethylenediaminetetraacetic acid, glutamic acid, malate or mixtures thereof. In an embodiment, the aggregate inorganic acid concentration used for the acid leaching of the calcined media in block 122 may be in a range of 0.05 mole/liter to 1.0 mole/liter. The aggregate dosage of organic acid (e.g citric acid) may range from 8.0 kg/ton to 15.0 kg/ton of product. In some embodiments, the aggregate inorganic acid strength used in block 122 may be 0.1 mole/liter-0.5 mole/liter. In an embodiment, the retention time may range from 20 minutes to 100 minutes. In an embodiment, the temperature may range from 80° C. to 99° C. under ambient pressure. For example, in a preferred embodiment, a total of 1 hour retention time at about 95° C. under ambient pressure may be used. In some embodiments, the acid leaching may be carried out at reaction temperature of 80° C. to 90° C. and at about atmospheric pressure. In other embodiments where even higher purity products are desired, there is an option of polish leaching the calcined material under pressure at 69 kPa to 690 kPa using the same acid concentration as under ambient pressure, but the temperature is increased to 110° C. to 150° C.

At the end of the leach time in block 122, the process 100 proceeds to block 124.

In block 124, the slurry is dewatered and the resulting cake is thoroughly rinsed with deionized water using a pressure filter to ensure that the conductivity of 10 wt % slurry of the dried product is less than 20 µS/cm.

In block 126, the cake is dried (e.g., in an oven at 120° C.) and dispersed to obtain the final Fenon (ultra-high purity and ultra-high performance) diatomaceous earth media or product. To maintain the integrity of the diatom particles and preserve the centrifuged wet density of the product, drying of the cake is carried out using a static dryer, typically a tray dryer, and the dried cake is dispersed with the use of a centrifugal sifter.

Method of Preparing the Flux-Calcined Fenon Products of the Present Invention

If ultra-high performance and ultra-high purity flux-calcined product/media with ultra-low extractable chemistry and permeabilities ranging from about 750 millidarcies to about 3750 millidarcies are desired, the process 100 proceeds from block 110 to block 130 and the dried dispersed product of block 110 is used as feed for making the flux-calcined products. The process conditions are selected such that the resulting flux-calcined media or products (except for the lightly-flux calcined products described above), generally have permeabilities of 1000 millidarcies or higher.

In block 130, one or more fine milled fluxing agents is thoroughly blended into the dried feed and calcined within a temperature range of 815° C. to 1204° C. (1500° F. to 2200° F.) for a period ranging from 15 minutes to 100 minutes, usually utilizing the longer retention time end of this range, as compared to non-beneficiated feed, because of the purity of the material which increases the insulating properties of the feed and hinders sintering. In a preferred embodiment, the calcination time may be in a range from 20 minutes to 90 minutes. The total amount of fluxing agent(s) in aggregate used for generating products with permeabilities of 750 millidarcies to 3750 millidarcies generally ranges from about 3 wt % to about 8 wt %. The fluxing agent(s) may include an alkali oxide fluxing agent, soda ash, potash, borax, lithium oxide or mixtures thereof. For example, in an embodiment, the fluxing agent may include soda ash. In another embodiment the fluxing agent may be soda ash. The appropriate temperature for the calcination operation is mostly determined by the source of the diatomaceous earth ore, but will typically range from 870° C. to 1200° C., as there is some variation in the sintering and agglomerating temperatures among the various ore types. The flux calcination process may be carried out in a directly-fired kiln in which the diatomaceous earth media/product makes direct contact with the flame from the kiln burner. Alternatively, an indirectly-fired kiln, in which the shell of the kiln is heated from the outside and the diatomaceous earth media/product does not make any direct contact with the burner flame and calcination is achieved through heat conduction, may be employed. The flux-calcined diatomaceous earth product/media (excluding the lightly flux-calcined) generated by the process have permeabilities of 750 millidarcies to 3750 millidarcies.

Even though the flux-calcined diatomaceous earth products/media are obtained from the calcination of the purified pressure leached feed, the extractable chemistry of such products/media may not be low enough to qualify the diatomaceous earth products/media as ultra-pure diatomaceous earth product/media having ultra-low extractable metals after the calcination step. In order to obtain the ultra-low extractable products/media taught by this disclosure, the process 100 may proceed from block 130 to block 132.

In block 132, the flux-calcined products/media is dispersed into powder and then slurried into 10 wt % to 15 wt % solids to prepare it for polish leaching. The slurry may be (acid) leached in a glass reactor using inorganic acid (for example, a mineral acid). The inorganic acid may include a mineral acid. The mineral acid may include sulfuric acid, nitric acid, hydrochloric acid, or mixtures thereof. In an embodiment, the aggregate inorganic acid concentration used for the acid leaching of the calcined media in block 132 may be in a range of 0.05 mole/liter to 1.0 mole/liter. In some embodiments, the aggregate mineral acid strength used in block 132 may be 0.1 M-0.5 M. In an embodiment, the retention time may range from 20 minutes to 100 minutes. In an embodiment, the temperature may range from 80° C. to 99° C. under ambient pressure. For example, in a preferred embodiment, a total of 1 hour retention time at about 95° C. under ambient pressure may be used. In other embodiments, the acid leaching may be carried out at reaction temperature of 95° C.-100° C. and at about atmospheric pressure.

Alternatively, for the highest purity, lowest extractable impurity versions of the Fenon products/media, the flux-calcined material may be polish leached under pressure (e.g. 69 kPa to about 690 kPa above atmospheric pressure) using the same acid concentration as under ambient pressure but with the temperature increased to a temperature in the range of 110° C. to 150° C. At the end of the leaching unit operation of block 132, the process proceeds to block 134.

In block 134, the slurry is dewatered and thoroughly rinsed with deionized water using a pressure filter to ensure that the conductivity of 10 wt % slurry of the dried media/product is less than 20 µS/cm. The process 100 then proceeds to block 136.

In block 136, the cake is dried and dispersed to obtain the final Fenon (ultra-high purity, ultra-high performance) diatomite filtration product/media of the present disclosure. To maintain the integrity of the diatom particles and preserve the centrifuged wet density of the product, drying the cake takes place in a static dryer, typically a tray dryer and the dried cake is dispersed with the use of a centrifugal sifter.

Comparison of the Fenon (Ultra-High Purity, Ultra-High Performance) Products of the Present Invention with the Prior Art Higher Permeability Shiuh et al. teach purified natural diatomite products which fall within the permeability ranges of about of 25 millidarcies and 65 millidarcies. Shiuh et al. also teach a purified calcined diatomaceous earth product with a permeability of about 300 millidarcies and a flux-calcined product with permeability of approximately 1200 millidarcies.

The Advanced Minerals® (a subsidiary of Imerys Filtration and Additives) plant in Lompoc, Calif., USA manufactures Celpure® products. The Celpure® products manufactured at this plant are purified diatomaceous earth products in permeabilities of about 65 millidarcies (Celpure 65), about 100 millidarcies (Celpure 100), about 300 millidarcies (Celpure 300) and about 1000 millidarcies (Celpure 1000). (Technical Note: AMC10-Celpure-C, Regulatory Support Package, version 1.8, 2008; Sulpizio, 2009). This disclosure teaches, among other things, a method of producing Fenon (ultra-high purity, ultra-high performance) filtration media with permeabilities ranging from greater than 750 millidarcies up to about 3750 millidarcies. These products also possess very low centrifuged wet densities of 0.162 g/ml (10.1 lb/ft3)-0.232 g/ml (14.5 lb/ft3) and high silica contents of 96 wt % to 98 wt %.

Very High Silica Specific Volumes

Table 7A shows the range of centrifuged wet density and the corresponding silica specific volume for Fenon products of the present invention versus prior art products in the 25 millidarcies to 300 millidarcies permeability range. Products of the present invention have higher silica specific volume for all the grades in this permeability range, in comparison with commercially available Celpure products and the prior art by Shiuh et al.

TABLE 7A

Centrifuged Wet Density and Silica Specific Volume of Fenon and Prior Art Products 25 md to 300 md permeability range

| | $^1$CWD (g/ml) |
|---|---|
| Present Invention | 0.167-0.194 |
| Celpure Grades | 0.244-0.292 |
| Shiuh et al. | 0.210 |

| | $^2$SSV |
|---|---|
| Present Invention | 4.9-6.0 |
| Celpure | 3.2-4.0 |
| Shiuh et al. | 4.7 |

$^1$centrifuged wet density
$^2$silica specific volume

Table 7B shows the centrifuged wet density and the corresponding silica specific volumes for the Fenon products of the present invention and for the prior art products of Shiuh et al and Celpure in the 1000 millidarcy permeability range. No comparative data is available for prior art products with permeabilities greater than about 1200 millidarcy.

TABLE 7B

Centrifuged Wet Density and Silica Specific Volume of Fenon and Prior Art Products 1000 millidarcies up to 3535 millidarcy permeability

| | 1045-1235 millidarcy | Greater than 1235 millidarcy |
|---|---|---|
| $^1$CWD (g/ml) | | |
| Present Invention | 0.165-0.208 | 0.162-0.245 |
| Celpure Grades | 0.213 | n/a |
| Shiuh et al. | 0.160 | n/a |
| $^2$SSV | | |
| Present Invention | 4.7-6.0 | 3.9-6.0 |
| Celpure | 4.4-4.5 | n/a |
| Shiuh et al. | 6.1 | n/a |

$^1$centrifuged wet density
$^2$silica specific volume
"n/a" means not available Extractable Metals Factor (EMF)—Utilizing EBC Method A comparison of the Extractable Metals Factor (EMF) of the present invention and that of the Celpure commercial products are shown in Table 8, which indicates a significantly lower extractable metals factor for the products of the present invention in comparison to the competitive products. No data is available for the prior art by Shiuh et al, but since the Shiuh et al. products are not acid washed after the thermal sintering process, it is obvious that they would not achieve the low EMF levels of the Fenon or Celpure products. The EMF values in Table 8 were determined using the EBC method.

TABLE 8

Extractable Metals Factor (EMF) of Fenon and Prior Art Products

| | EMF (ppm) |
|---|---|
| Present Invention | 2-5 |
| Celpure Grades | 9-23 |
| Shiuh et al. | $^2$n/a |

$^1$mD—millidarcies
$^2$ n/a—data not available

ASBC Beer Soluble Metals

Results from using the ASBC beer extraction method to test for the solubility of iron, aluminum and calcium in beer are shown in Table 9 for the products of the present invention and the other competitive products.

TABLE 9

ASBC Soluble Metals Extraction into Beer for Fenon Products and Prior Art Products (mg/kg)

| Products | Metals | ASBC Range |
|---|---|---|
| Present Invention | Fe | $^1$below LD |
| | Al | $^2$nd |
| | Ca | nd |
| Celpure Grade | Fe | 0.3-7.2 |
| | Al | nd |
| | Ca | nd |
| Shiuh et al. | $^4$Fe | 2-7 |
| | $^5$Al | 2-10 |
| | Ca | $^3$n/a |

$^1$LD—Limit of Detection (lowest level detectable) using GFAAS is 0.1 ppm (ASBC method and EBC method) or 0.1 mg soluble metal/kg; a value "below LD" is used when no soluble metal content was detected using GFAAS.
$^2$nd—non-detectable values (subtraction of metal in beer background gives zero results)
$^3$n/a—means data not available
$^4$Fe—limit of detection of iron for the test method used from Shiuh et al. was 2 ppm
$^5$Al—limit of detection of aluminum for the test method used from Shiuh et al. was 2 ppm The extractable metals results for the ultra-high purity, high performance products clearly show that the Fenon products of the present invention are superior in terms of lower extractable chemistry in beer as compared to the prior art and the commercially available Celpure products. Shiuh et al. teaches highly purified products with beer soluble iron (BSFe) of between 2 and 7 ppm and beer soluble aluminum (BSAl) of between 2 and 10 ppm. The beer soluble calcium (BSCa) was not disclosed by Shiuh et al. during their metals extractable test in beer. The beer extractible metals results of the Fenon (ultra-high purity, ultra-high performance) products show that iron concentration is below the limit of detection (LD) of 0.1 ppm and aluminum and calcium concentrations are zero. Detectable concentrations of iron are shown in all of the Celpure products above the 0.1 ppm limit with the aluminum and calcium levels at zero concentration.

Detectable levels of Al, Fe and Ca were obtained for the same products of the Fenon (ultra-high purity, ultra-high performance) products using the EBC method, an indication that the ASBC beer extraction method is a less rigorous test as compared to the EBC approach. Metals solubility of the Celpure products in beer is shown to be higher than that of the present invention and it is also indicated in the EBC extraction data at even higher levels. These results show that extractible metals factor using the EBC approach will be much higher in the products of Shiuh et al. as compared to that of the present invention since there was no polishing step for the final product.

Manufacturing Process

Table 10 provides a comparison of the main differences between the process of the present invention and the prior art high purity processes. For the present invention, the crude ore selection criteria requires the use of diatomite ores possessing naturally low centrifuged wet densities, which are amenable to leaching, whereas the ore requirement for both Shiuh et al. and the Celpure process is diatomite with unwanted non-diatomite mineral fractions which are amenable to flotation. Shiuh et al. teaches the making of a highly purified diatomite product with a process that ends with a calcination stage. Unlike the Shiuh et al. approach, the final stage of the Celpure process is acid washing after calcination. The present disclosure achieves the lowest extractable metals with the use of a combination of pressure leaching of the feed material to effectively reduce the critical impurities in the feed and finishing the process with enhanced acid wash/pressure leach of the final product. Extractable metal impurities of the products of the present invention are therefore very low in comparison to the prior art products of Shiuh et al. and Celpure, as shown in Tables 8 and 9.

ability of the product/media is specifically used to measure the flow rate of a liquid through the product/media, the permeability of the product/media is also often correlated with the particle size exclusion capability of the product/media. In other words, products/media with higher permeabilities generally provide for higher flux through the filter cakes, but lower size exclusion (higher permeability products/media cannot remove as fine particles as coarser permeability products/media remove).

Permeability measurements of the filter cake samples described herein were performed using either the VEL Permeameter method (Analitika—EBC 1985), for products with permeabilities 300 millidarcies or lower or the Celatom Permeameter method disclosed in U.S. Pat. No. 5,878,374, for products with permeabilities greater than 300 millidarcies.

The VEL Permeameter method uses a measuring device that is in the form of a cylindrical tube with a pressure gauge and a septum. The filter aid powder to be tested is weighed into a beaker and 450 ml tap water is added to suspend the material in slurry form. A Whatman® #4 filter paper is placed on the septum of the device and the tube is then bolted down to ensure no leakages. Using a glass rod, the slurry is poured into the tube, the top closed and the required air pressure is applied to cause the flow of the liquid into a graduated cylinder. A filter cake will form on the filter paper as the liquid is filtered; the air pressure is shut off when about 1 cm of liquid is left on top of the cake. The top is opened and the collected water is gently poured back into the tube, ensuring that the cake is not disturbed. After a five-minute

TABLE 10

Process differences between the present invention, Celpure and Shiuh et al.

| | Present Invention | Celpure | Shiuh et al. |
|---|---|---|---|
| Stage 1 | Ore selection - based on low CWD/amenability to leaching | Ore selection - based on amenability to flotation of unwanted DE | Ore selection - based on amenability to flotation of mineral impurities |
| Stage 2 | Dry process feed preparation | Wet process feed preparation | Wet process feed preparation |
| Stage 3 | Chemical beneficiation by pressure leaching | Physical beneficiation by flotation | Physical beneficiation by flotation |
| Stage 4 | Filter cake drying | Filter cake drying | Thickening and acid washing |
| Stage 4 | Calcination | Calcination | Calcination |
| Stage 5 | Acid washing and drying | Acid washing and drying | — |

Methods of Characterizing the Fenon (Ultra-High Purity, Ultra-High Performance) Diatomite Filtration Products/Media The methods of characterizing the Fenon (ultra-high purity, ultra-high performance) products/media of the present disclosure, as well as other comparative diatomaceous earth products, are described in detail in the sections below.

Permeability

The permeability of the filter cake (containing diatomite filtration product/media) is a measure of the flow rate of a standard liquid through a standard amount of the filtration product/media under standard conditions. It is an important characteristic, almost always used in the specifications for diatomite filtration media products. Other important characteristics used in establishing specifications for these products include: centrifuged wet density, particle size distribution, solids retention and other physical and chemical properties. Filtration using filter cakes containing diatomaceous earth is applied in the removal of particulate solids from fluids in industrial processes, and, while the permewaiting period, the pressure is again applied at the required set-point and a timed volume of liquid, 100-300 ml, is collected. The rest of the liquid is allowed to drain from the tube to obtain a dry cake. The dewatered cake is removed and the thickness is measured. The filtrate temperature is also measured and the corresponding viscosity of the water is obtained. The permeability ((3) of the cake in millidarcies is then calculated as:

$$\beta = \frac{101.3 \text{ (kPa)} * V \text{ (cm}^3) * h \text{ (cm)} * \eta \text{ (mPa.s)}}{A \text{ (cm}^2) * \Delta P \text{ (kPa)} * t \text{ (sec)}} * 1000$$

Where,

V=constant: 200 cm$^3$ and it is the volume of timed liquid

A=constant: 20.22 cm$^2$ and it is the filtration area of the VEL tube $\Delta P$=applied pressure: 50 kPa or 200 kPa depending on whether the material has a slow or fast flow rate h=height of filter cake formed in cm (may vary depending on the wet bulk density of the material)

η=viscosity of water in mPa·s (milliPascals·seconds)

Table 11 below gives the test parameters used for different permeability ranges of the filter aid material to be tested.

TABLE 11

VEL Permeameter Test Conditions

| Product Category | Flux Calcined | Calcined | Calcined & Naturals | Units |
|---|---|---|---|---|
| Permeability | >500 | 50-500 | <50 | mDarcy |
| Sample Weight | 40 | 20 | 10 | g |
| Test Pressure | 50 (7.25 PSI) | 200 (29 PSI) | 200 (29 PSI) | kPa |

The Celatom Permeameter is an automated instrument that forms a "filter cake" from a diatomite sample of known mass and then measures all required parameters needed to calculate permeability and wet bulk density. Tap water is used as the fluid medium in the measurement. The equations for calculating wet bulk density (ρ) in g/ml and permeability (β) in millidarcies are listed below:

$$\rho = \frac{m}{h * A}$$

$$\beta = \frac{V * h * \eta}{A * \Delta P * t} * 1000$$

Where:
A=cross-sectional area of the cake (cm$^2$)
ΔP=pressure drop across the cake (atm)
t=time of flow (s)
m=dry sample mass (g)
η=filtrate viscosity (cp)
V=filtrate volume (ml)
h=cake height (cm)

Bulk Chemistry

Diatomaceous earth contains primarily the skeletal remains of diatoms and includes primarily silica, along with some minor amounts of impurities like magnesium, calcium, sodium, aluminum, and iron. The percentages of the various elements may vary depending on the source of the diatomaceous earth deposit. The biogenic silica found in diatomaceous earth is in the form of hydrated amorphous silica minerals which are generally considered to be a variety of opal with a variable amount of hydrated water (Enrico et al., 1948). Other minor silica sources in diatomaceous earth may come from finely disseminated quartz, chert and sand. These minor silica sources however do not have the intricate and porous structure of the biogenic diatom silica species.

The bulk chemistry of diatomaceous earth ores and products determines the quality of the material and, in general, impacts the extractable metals properties of the filter aid product. XRF (X-ray fluorescence) spectroscopy is widely accepted as the analytical method of choice for determining the bulk chemistry of diatomaceous earth material and it is a non-destructive analytical technique used to determine the elemental composition of materials. XRF analyzers determine the chemistry of a sample by producing a set of characteristic fluorescent X-rays that is unique for that specific element, which is why XRF spectroscopy is an excellent technology for qualitative and quantitative analysis of material composition. In the testing of the bulk chemistry of the diatomaceous earth materials reported herein, 5 g dried powdered sample together with 1 g of X-ray mix powder binder are finely milled in a Spex® mill and then pressed into a pellet. The pellet is loaded into an automated Wavelength Dispersive (WD) XRF equipment, which has been previously calibrated with diatomaceous earth reference averages, to determine the bulk chemistry. To accommodate the natural loss of hydration within the silica structure, the total mineral contents for all the examples are reported on the Loss-on-Ignition (LOI) or on ignited basis for their respective high oxides. As used herein, "on ignited basis" means the mineral oxide content measured without the influence of the water of hydration within the silica structure. The results of the chemistry of the ultra-high purity products and other competitive materials are herein presented in the Examples section.

Centrifuged Wet Density

The wet density of a diatomaceous earth crude ore or product is a measure of the void volume available for capturing particulate matter during a filtration process. Wet densities are often correlated with unit consumption of diatomite filtration media. In other words, a diatomite filtration media possessing a low centrifuged wet density often provides for low unit consumption of the diatomite product in filtration operations.

Several methods have been used to characterize the wet density of diatomite filtration media products. The method used in this invention is the centrifuged wet density (CWD). This test method has been used frequently in the patent prior art, such as in U.S. Pat. No. 6,464,770 (Palm et al. (2002)). In this test method, 10 ml of deionized water is first added to a 15 ml graduated centrifuge glass tube and 1 g of dry powder sample is loaded into the tube. The sample is completely dispersed in the water using a vortex-genie 2 shaker. A few milliliters of deionized water is then used to rinse the sides of the tube to ensure all particles are in suspension and the contents brought up to the 15 milliliters mark. The tube is centrifuged for 5 min at 2680 rpm and the volume of the settled solids noted by reading off at the graduated mark. The centrifuged wet density is determined as weight of the sample divided by the volume in g/ml. A conversion factor of 62.428 is applied to obtain the centrifuged wet density in lb/ft3.

Silica Specific Volume

Silica specific volume is calculated as follows:

$$\text{Silica Specific Volume} = \frac{\text{Fraction Silica Content}}{\text{Centrifuged Wet Density}}$$

Where:
Fraction Silica Content=percentage SiO$_2$ in content in the diatomite divided by 100
Centrifuged Wet Density=grams per milliliter of solids (g/ml)

It is apparent from the equation that a product with high silica content and low centrifuged wet density will result in a high silica specific volume.

Extractable Metals Factor (EMF) and Extractable Metals Test Methods

As mentioned above, in many applications, it is preferable for diatomite filtration media to have low levels of extractable impurities because extractables are compounds that can migrate from the filter aid material into the liquid product.

The major bulk impurities in diatomaceous earth products are aluminum, iron and calcium and they also form the major extractable metals when the filter aid comes into contact with a fluid. To quantify the contribution of these metals to the extractables, it is prudent to determine the total of these metals in the fluid, which is represented by the Extractable Metals Factor (EMF):

Extractable Metals Factor=$\Sigma$(Al,Fe,Ca)

Where:
Al, Fe, Ca are the soluble metals in mg per kg of diatomaceous earth product, using the European Brewery Convention (EBC) test method.

In other words, the EMF is a measure of the sum of the extractable aluminum, iron and calcium contained in a standard mass of the product/media under conditions specified by the European Brewing Convention (EBC) for the measurement of extractable iron. The relationship indicates that a higher quality filter aid product, from a purity standpoint, will have a lower extractible metals index.

The Consumption-Adjusted Extractable Metals Factor (CA-EMF) is the centrifuged wet density of a filter aid (or media) divided by the centrifuged wet density of a typical (or standard) DE filter aid (or media) multiplied by the Extractable Metals Factor for the filter aid (FA) (or media). For example, consumption-adjusted extractable metals factor for the lower density product of this disclosure is given as:

$$\text{Consumption-Adjusted } EMF = \frac{CWD \text{ of low density filter aid}}{CWD \text{ of Standard } DE \text{ Filter aid}} \times (EMF \text{ of low density } FA)$$

CWD of standard DE filter-aid was considered as 21 lb/ft$^3$ (or 0.336 g/ml).

It is important to recognize that results from less rigorous test methods may underrepresent the actual levels and extent of extractables, and that the use of more rigorous method is the most preferred way of determining the quality of a filter aid. The EBC method employed in the analysis of samples in this invention represents a more rigorous test as compared to a controlled extraction test, utilizing relevant model solvent systems such as sodium acetate buffer. The EBC extraction test method is also more rigorous than the American Society of Brewing Chemists (ASBC) extraction test method that uses beer as the extracting agent.

The European Brewery Convention (EBC) has established a compendium of accepted test methods, including a test method to determine the soluble metal contribution of filter media to filtrate. The EBC soluble metals test comprises suspending a representative sample (2.5% slurry concentration) of the media/product to be tested for two hours at ambient temperature in a 1% solution of potassium hydrogen phthalate (pH of 4), filtering the suspension, and then analyzing the filtrate of the sample solution for iron (Fe), calcium (Ca), aluminum (Al) and arsenic (As) contents using Inductively Coupled Plasma (ICP) spectrophotometers or Graphite Furnace Atomic Absorption (GFAA). The choice of using ICP or GFAA is based on the limit-of-detection (LD) of the element to be measured. The ICP instrument used in this analysis was of the Atomic Emission Spectrometry (AES) type. It uses the intensity of light emitted from a flame at a particular wavelength to determine the quantity of an element in a sample. The wavelength of the atomic spectral line gives the identity of the element while the intensity of the emitted light is proportional to the number of atoms of the element. The sample analyte is introduced into the flame as a sprayed solution. The heat from the flame evaporates the solvent and breaks chemical bonds to create free atoms. The thermal energy also excites the atoms that subsequently emit light. Each element emits light at a characteristic wavelength, which is dispersed by a grating or prism and detected in the spectrometer.

GFAA, also known as electrothermal atomization (ETA), is a technique for improving the sensitivity and limit-of-detection for atomic absorption measurements. In this test, a small amount of the filtrate sample solution is placed inside a hollow graphite tube. This is resistively-heated in a temperature program to burn off impurities, atomize the analyte to form a plume of free metal vapor, and finally clean the tube. The free atoms will absorb light at frequencies or wavelengths characteristic of the element of interest (hence the name atomic absorption spectrometry). Within certain limits, the amount of light absorbed can be linearly correlated to the concentration of analyte present.

A reliable test method for the determination of soluble metals from diatomaceous earth products in beer has been established in the industry (American Society of Brewing Chemist, 1987). The Graphite Furnace Atomic Absorption (GFAA) spectroscopy was used in the final determination of the concentration of soluble iron, aluminum and calcium in beer in the present invention. In the test, 2.5 g of dried product was added to 100 ml of de-carbonated BUD-WEISER® beer at room temperature in 250 ml Erlenmeyer flask and made to suspend by swirling. The flask was swirled again at 1, 2, 3, 4, and 5 minutes of elapsed time. For the last time, the flask was swirled again at 5 minutes and 50 seconds, and the entire content was immediately transferred to a funnel fitted with filter paper. The filtrate collected during the first 30 seconds was discarded and the test filtrate sample was then collected during the next 2 minutes and 30 seconds for a total elapsed time of 9 minutes for the extraction.

A set of iron, aluminum and calcium standards were prepared in the decarbonated beer and using beer as the blank, the standards were used to calibrate the spectrometer. The sample filtrates were then run to determine the concentration of the extractable metals in solution. The concentration of metal in beer was then calculated as:

Beer Soluble Metal (ppm)=(Metal (ppm) from ICP or GFAA)×Dilution Factor×40

Results from all the different permeability ranges of the ultra-high purity products of the present invention gave a concentration of less than 0.1 ppm (or 0.1 mg/kg) for each of iron, aluminum and calcium, below the detection limit of the test.

Brightness
Optical Properties

The optical properties of the powder were characterized by using the color space defined by the Commission Internationale de l'Eclairage (CIE), as the L*a*b* color space. The L* coordinate represents brightness and is a measure of reflected light intensity (0 to 100), the a* coordinate represents values showing color variation between green (negative value) and red (positive value), whereas the b* coordinate represents values showing color variation between blue (negative value) and yellow (positive value). A Konica Minolta® Chroma-meter CR-400 was used to measure the optical properties of samples described herein.

A dry representative sample (approximately 2 g or enough to cover the measuring tip of the meter) was taken and then ground using a mortar and pestle. The resulting ground powder was spread on white paper and pressed with a flat surface to form a packed smooth powder surface. The Chroma Meter was pressed on the powder and the readings were noted. The results of the optical tests for various ultra-high purity, high performance products are shown in the ensuing product examples.

EXAMPLES

Several exemplary Fenon (ultra-high purity, ultra-high performance) diatomite filtration media products of the present disclosure are described below. The method for the feed preparation for the pressure leaching was common to all of the products. The processes leading up to the pressure leaching stage are described in the section below.

The crude ore was dried and hammer-milled to pass 80 mesh size. A sample of the powder passing 80 mesh was then subjected to a centrifuged wet density test to determine if the density was in the range of 0.128 (8.0 lb/ft$^3$) g/ml to 0.256 g/ml (16 lb/ft$^3$), to be accepted as the ore for preparing the feed for the process. The standard operating procedure for carrying out the centrifuged wet density test is described herein under the "Methods of Characterizing the Fenon (Ultra-High Purity, Ultra-High Performance) Diatomite Filtration Products/Media" section of this disclosure. The milled material was then classified (after flash drying) with the use of a mechanical air classifier to separate heavy mineral impurities such as quartz, chert, or sand. The separator product was then leached under the process conditions shown in Table 12 below.

TABLE 12

Process conditions for pressure leaching of the diatomaceous earth ore

| Leaching time (min) | Leaching Temp. (° C.) | Leaching Pressure (kPa) | Leaching Solids (wt %) | Sulfuric Acid Concentration (M) |
|---|---|---|---|---|
| 60 | 160 | 690 | 14 | 0.7 |

The leached slurry was dewatered with the use of a pressure filter, and the resulting cake was rinsed with tap water to remove any residual acid. The moist cake was dried in an oven at 120° C. to less than 5% moisture and dispersed to obtain the chemically beneficiated natural diatomaceous earth product. The change in the bulk chemistry of the three different exemplary diatomite feed ores after the chemical beneficiation process is shown in Table 13.

TABLE 13

Bulk chemistry of various diatomite ores and the corresponding pressure leached products

| Bulk Chemistry | Crude Ore A | Pressure Leached Product - A | Crude Ore B | Pressure Leached Product - B | Crude Ore C | Pressure Leached Product - C |
|---|---|---|---|---|---|---|
| SiO$_2$ (wt %) | 86.97 | 97.40 | 92.40 | 98.07 | 95.80 | 98.2 |
| Al$_2$O$_3$ (wt %) | 5.77 | 1.29 | 4.53 | 1.20 | 2.22 | 1.18 |
| CaO (wt %) | 0.44 | 0.09 | 0.36 | 0.15 | 0.32 | 0.17 |
| MgO (wt %) | 0.29 | 0.11 | 0.38 | 0.13 | 0.23 | 0.09 |
| Na$_2$O (wt %) | 0.23 | 0.14 | 0.11 | 0.12 | 0.10 | 0.12 |
| K$_2$O (wt %) | 0.25 | 0.13 | 0.20 | 0.16 | 0.31 | 0.10 |
| Fe$_2$O$_3$ (wt %)[1] | 5.07 | 0.05 | 1.85 | 0.00 | 0.82 | 0.00 |
| MnO (wt %) | 0.01 | 0.01 | 0.01 | 0.01 | 0.01 | 0.01 |
| TiO$_2$ (wt %) | 0.9 | 0.76 | 0.14 | 0.14 | 0.14 | 0.11 |
| P$_2$O$_5$ (wt %) | 0.07 | 0.02 | 0.02 | 0.02 | 0.05 | 0.02 |
| Sum | 100.0 | 100.0 | 100.0 | 100.0 | 100.0 | 100.0 |

[1]Determined by XRF; lowest amount detectable by XRF is 0.001%

Example 1

Method of Preparing Fenon (Ultra-High Purity, Ultra-High Performance) Diatomite Non-Calcined Filtration Media In order to obtain the ultra-low extractable chemistry of the product, a slurry of the chemically beneficiated product was prepared and acid leached in a glass reactor using a combination of sulfuric acid and citric acid. The leaching conditions are shown in the Table 14 below.

TABLE 14

Process conditions for pressure leaching of the diatomaceous earth ore

| Leaching time (min) | Leaching Temp. (° C.) | Leaching Solids (wt %) | Sulfuric Acid Concentration (M) | Citric Acid Concentration (kg/ton) |
|---|---|---|---|---|
| 60 | 95 | 12 | 0.2 | 8.0-15.0 |

After leaching, the slurry was dewatered and thoroughly rinsed with deionized water to ensure that the conductivity of 10 wt % slurry of the dried product is less than 20 μS/cm. The cake was dried in an oven at 120° C. and dispersed to obtain the final ultra-high purity product. In another aspect of the process, the polish leaching was carried out under pressure using 0.2 M sulfuric acid to generate even much lower extractable metals chemistry. Data on the analysis of the exemplary Fenon natural products from three crude ore sources represented by examples A, B and C are given in Table 15 below.

Example 1

TABLE 15

Properties of exemplary Non-calcined Fenon (Ultra-high Purity, Ultra-High Performance) Biogenic Silica Products

| | Product from Ore source A | Product from Ore source B | Product from Ore source C |
|---|---|---|---|
| SiO$_2$ (wt %) | 97.50 | 98.32 | 98.50 |
| Al$_2$O$_3$ (wt %) | 1.20 | 0.76 | 0.94 |
| CaO (wt %) | 0.09 | 0.08 | 0.17 |

TABLE 15-continued

Properties of exemplary Non-calcined Fenon (Ultra-high Purity, Ultra-High Performance) Biogenic Silica Products

| | Product from Ore source A | Product from Ore source B | Product from Ore source C |
|---|---|---|---|
| MgO (wt %) | 0.11 | 0.07 | 0.09 |
| Na$_2$O (wt %) | 0.11 | 0.10 | 0.06 |
| K$_2$O (wt %) | 0.15 | 0.05 | 0.04 |
| Fe$_2$O$_3$ (wt %)[5] | 0.00 | 0.00 | 0.00 |
| MnO (wt %) | 0.01 | 0.01 | 0.01 |
| TiO$_2$ (wt %) | 0.76 | 0.55 | 0.13 |
| P$_2$O$_5$ (wt %) | 0.03 | 0.02 | 0.02 |
| Sum | 100.0 | 100.0 | 100.0 |
| [1]Perm (mD) | 35 | 61 | 75 |
| [2]CWD (g/ml) | 0.184 | 0.162 | 0.199 |
| CWD (lb/ft$^3$) | 11.5 | 10.1 | 12.4 |
| [3]SSV | 5.3 | 6.1 | 4.9 |
| [4]EMF (ppm) | 5.0 | 4.5 | 5.0 |
| Color [L*, b*] | [96.8, 3.5] | [96.1, 3.3] | [96.7, 2.8] |

[1]Permeability of Product - millidarcies
[2]Centrifuged Wet Density (CWD)
[3]Silica Specific Volume (SSV)
[4]Extractable Metals Factor (EMF)
[5]Determined by XRF; lowest amount detectable by XRF is 0.001%

Example 2

Method of Preparing Fenon (Ultra-High Purity, Ultra-High Performance) Diatomite Filtration media in the permeability ranges of 10 millidarcies to 749 millidarcies (calcined or flux calcined).

The dried dispersed pressure leached product was used as feed for manufacturing the straight-calcined products and the lightly flux-calcined products. The feed was calcined in the muffle furnace and the calcined product was dispersed. A slurry of the calcined product was prepared and leached in a glass reactor. For the products with permeability range of 150-749 millidarcies), approximately 2.5% soda ash fluxing agent was added to the feed material to enhance agglomeration and produce a lightly fluxed calcined product. A combination of sulfuric acid and citric acid was used in the polish leaching process with the exception of the products in the 150 millidarcies to 749 millidarcies range, where only sulfuric acid was used. The sulfuric acid strength was 0.2 M in all cases and the amount of citric acid introduced was 10 kg/ton product solids. The process conditions for calcination of the feed and the subsequent atmospheric leaching for the various product grades are given in Table 16 below.

TABLE 16

Process conditions for preparing products ranging from 10 millidarcies to 749 millidarcies

| Product Permeabilities (millidarcies) | Calcination Temp. (° C.) | Calcination Time (min) | Leaching Time (min) | Leaching Solids (wt %) | Leach Temp. (° C.) |
|---|---|---|---|---|---|
| 10-45 | 870 | 45 | 60 | 12 | 95 |
| 46-85 | 915 | 45 | 60 | 12 | 95 |
| 86-150 | 955 | 45 | 60 | 12 | 95 |
| 151-749 | 980 | 45 | 60 | 12 | 95 |

At the end of the leach time, the slurry was dewatered and the resulting cake thoroughly rinsed with deionized water using a pressure filter to ensure that the conductivity of 10 wt % slurry of the dried product was less than 20 μS/cm. The cake was dried in an oven at 120° C. and dispersed to obtain the final ultra-high purity, ultra-low extractables product. Examples of the properties of the exemplary slow grade products that were prepared in the present disclosure are given in Tables 17-20 below.

Example 2A—Exemplary Non-Calcined Products

The properties of the non-calcined products in example are shown in Table 17. The bulk chemistry of these final products as determined by XRF analysis shows iron oxide of 0.00 (wt %) and 0.10% Fe$_2$O$_3$, which is a unique feature of the pressure leached feed materials used in making the final products. The extractable metals factor of 4.0 in both examples is extremely low for this slow grade product.

TABLE 17

Exemple 2A - Exemplary Non-Calcined Products)

| | Product from Ore source A | Product from Ore source B |
|---|---|---|
| [1]Perm | 25 | 35 |
| SiO$_2$ (wt %) | 98.04 | 97.87 |
| Al$_2$O$_3$ (wt %) | 1.21 | 1.31 |
| CaO (wt %) | 0.18 | 0.19 |
| MgO (wt %) | 0.08 | 0.09 |
| Na$_2$O (wt %) | 0.14 | 0.17 |
| K$_2$O (wt %) | 0.12 | 0.13 |
| Fe$_2$O$_3$ (wt %)[5] | 0.00 | 0.10 |
| MnO (wt %) | 0.01 | 0.01 |
| TiO$_2$ (wt %) | 0.15 | 0.16 |
| P$_2$O$_5$ (wt %) | 0.02 | 0.02 |
| Sum | 100.0 | 100.0 |
| [2]CWD (g/ml) | 0.168 | 0.215 |
| CWD (lb/ft$^3$) | 10.5 | 13.4 |
| [3]SSV | 5.8 | 4.6 |
| [4]EMF (ppm) | 4.0 | 4.0 |
| Color [L*, b*] | [96.3, 3.5] | [96.8, 3.2] |

[1]Permeability of Product - in millidarcies
[2]Centrifuged Wet Density (CWD)
[3]Silica Specific Volume (SSV)
[4]Extractable Metals Factor
[5]Determined by XRF; lowest amount detectable by XRF is 0.001%

Example 2B—Exemplary Calcined Products

Table 18 shows examples of calcined products, A, B and C made from three different crude ore sources In all cases, the silica content is greater than 98% (w/w) SiO$_2$, the alumina level is less than 1.0 wt % Al$_2$O$_3$ and iron oxide level is 0.00 wt % Fe$_2$O$_3$.

Products A, B and C or Example 2B of the present disclosure show significantly lower centrifuged wet density, ranging from 0.175 g/ml (10.9 lb/ft$^3$) to 0.199 g/ml (12.4 lb/ft$^3$) with corresponding high silica specific volume ranging from 4.6 to 5.8. Very low Extractable Metals Index was obtained for all the 3 product examples of the present invention.

TABLE 18

Example 2B - Exemplary Calcined Products (millidarcies)

| | Product from Ore source A | Product from Ore source B | Product from Ore source C |
|---|---|---|---|
| [1]Perm | 70 | 73 | 65 |
| SiO$_2$ (wt %) | 98.49 | 98.50 | 98.12 |
| Al$_2$O$_3$ (wt %) | 0.96 | 0.94 | 0.76 |
| CaO (wt %) | 0.15 | 0.17 | 0.08 |

TABLE 18-continued

Example 2B - Exemplary Calcined Products (millidarcies)

|  | Product from Ore source A | Product from Ore source B | Product from Ore source C |
|---|---|---|---|
| MgO (wt %) | 0.08 | 0.09 | 0.07 |
| $Na_2O$ (wt %) | 0.07 | 0.06 | 0.10 |
| $K_2O$ (wt %) | 0.07 | 0.04 | 0.05 |
| $Fe_2O_3$ (wt %)[5] | 0.00 | 0.00 | 0.00 |
| MnO (wt %) | 0.01 | 0.01 | 0.01 |
| $TiO_2$ (wt %) | 0.12 | 0.13 | 0.75 |
| $P_2O_5$ (wt %) | 0.02 | 0.02 | 0.02 |
| Sum | 100.0 | 100.0 | 100 |
| [2]CWD (g/ml) | 0.226 | 0.192 | 0.168 |
| CWD (lb/ft$^3$) | 14.1 | 12.0 | 10.5 |
| [3]SSV | 4.4 | 5.1 | 5.8 |
| [4]EMF (ppm) | 4.0 | 4.0 | 2.0 |
| Color [L*, b*] | [97.2, 2.8] | [97.5, 2.5] | [96.8, 3.1] |

[1]Permeability of product - millidarcies
[2]Centrifuged Wet Density (CWD)
[3]Silica Specific Volume (SSV)
[4]Extractable Metals Factor
[5]Determined by XRF; lowest amount detectable by XRF is 0.001%

Example 2C—Exemplary Calcined Products

Three products of similar permeabilities produced from three different ore sources are included in Example 2C. The characteristics of these three products are shown in Table 19. The silica content for the exemplary three individual products A, B and C that were made from different ores is all greater than 98% $SiO_2$ and with iron oxide content of 0.00% (w/w) $Fe_2O_3$. The centrifuged wet density of the exemplary products A, B and C is much lower as well, in the range of 0.167 g/ml (10.4 lb/ft$^3$) and 0.194 g/ml (12.1 lb/ft$^3$) and the silica specific volume ranges from 4.4 to 5.9. The EMF of the ultra-high purity products is at extremely low concentration in a range from 2.0 to 3.5.

TABLE 19

Example 2C - Exemplary Calcined Products

|  | Product from Ore source A | Product from Ore source B | Product from Ore source C |
|---|---|---|---|
| [1]Perm (mD) | 110 | 106 | 115 |
| $SiO_2$ (wt %) | 98.37 | 98.32 | 98.42 |
| $Al_2O_3$ (wt %) | 1.05 | 0.76 | 0.82 |
| CaO (wt %) | 0.14 | 0.08 | 0.06 |
| MgO (wt %) | 0.08 | 0.07 | 0.07 |
| $Na_2O$ (wt %) | 0.09 | 0.10 | 0.10 |
| $K_2O$ (wt %) | 0.09 | 0.05 | 0.05 |
| $Fe_2O_3$ (wt %)[5] | 0.00 | 0.00 | 0.00 |
| MnO (wt %) | 0.01 | 0.01 | 0.01 |
| $TiO_2$ (wt %) | 0.12 | 0.55 | 0.45 |
| $P_2O_5$ (wt %) | 0.02 | 0.02 | 0.02 |
| Sum | 100.0 | 100.0 | 100.0 |
| [2]CWD (g/ml) | 0.223 | 0.167 | 0.168 |
| CWD (lb/ft$^3$) | 13.9 | 10.4 | 10.5 |
| [3]SSV | 4.4 | 5.9 | 5.9 |
| [4]EMF (ppm) | 2.0 | 3.5 | 2.9 |
| Color [L*, b*] | [97.8, 1.8] | [98.1, 1.8] | [98.2, 1.6] |

[1]Permeability of Product - millidarcies
[2]Centrifuged Wet Density (CWD)
[3]Silica Specific Volume (SSV)
[4]Extractable Metals Factor
[5]Determined by XRF; lowest amount detectable by XRF is 0.001%

Example 2D—Exemplary Lightly Flux Calcined Products

Example 2D (Table 20) provides some examples of lightly flux-calcined products of this disclosure, made from different crude ores. The silica content of the present invention is greater than 97% $SiO_2$ with alumina content of around 1% $Al_2O_3$ and iron oxide content of 0.00% $Fe_2O_3$. A much lower centrifuged wet density was obtained in the range of 0.163 g/ml (10.2 lb/ft$^3$) and 0.204 g/ml (12.7 lb/ft$^3$). The combined effect of these low densities and the high silica chemistry results in a relatively higher silica specific volume. The EMF's for the products of the present invention are in a range of 2.6 to 4.0.

TABLE 20

Example 2D - Lightly Flux Calcined Products

|  | Product from Ore source A | Product from ore source B |
|---|---|---|
| [1]Perm (mD) | 321 | 307 |
| $SiO_2$ (wt %) | 97.40 | 97.89 |
| $Al_2O_3$ (wt %) | 0.99 | 1.04 |
| CaO (wt %) | 0.08 | 0.12 |
| MgO (wt %) | 0.08 | 0.08 |
| $Na_2O$ (wt %) | 0.75 | 0.50 |
| $K_2O$ (wt %) | 0.10 | 0.09 |
| $Fe_2O_3$ (wt %)[5] | 0.00 | 0.00 |
| MnO (wt %) | 0.01 | 0.01 |
| $TiO_2$ (wt %) | 0.57 | 0.21 |
| $P_2O_5$ (wt %) | 0.02 | 0.02 |
| Sum | 100.0 | 100.0 |
| [2]CWD (g/ml) | 0.163 | 0.204 |
| CWD (lb/ft$^3$) | 10.2 | 12.7 |
| [3]SSV | 6.0 | 4.8 |
| [4]EMF (ppm) | 2.6 | 4.0 |
| Color [L*, b*] | [98.4, 1.28] | [98.3, 1.31] |

[1]Product Permeability - millidarcies
[2]Centrifuged Wet Density (CWD)
[3]Silica Specific Volume (SSV)
[4]Extractable Metals Factor
[5]Determined by XRF; lowest amount detectable by XRF is 0.001%

Example 3: Fast Flux Calcined Products

Method of Preparing Fenon (Ultra-High Purity, Ultra-High Performance) Fast Grade Biogenic Silica Products The dried dispersed pressure leached product was used as feed for making the flux-calcined products. Fine milled soda ash was thoroughly blended into the dried feed and calcined in the muffle furnace at a given temperature based on the target permeability range of the product.

In order to obtain the ultra-low extractable product as dictated by this disclosure, the flux-calcined product was dispersed into powder and a 12 wt % solids slurry was prepared for polish leaching. The slurry was acid leached in a glass reactor using sulfuric acid. At the end of the leach time, the slurry was dewatered and the resulting cake thoroughly rinsed with deionized water using a pressure filter to ensure that the conductivity of 10 wt % slurry of the dried product was less than 20 µS/cm. The cake was dried and dispersed to obtain the final ultra-high purity, ultra-low extractables product. The process conditions used in preparing the products are shown in Table 21 below.

TABLE 21

Process conditions for preparing Fast Flux Calcined Products

| Product Permeability (millidarcies) | Soda Ash Addition (wt %) | Calcination Temp. (° C.) | Calcination Time (min) | Leaching Time (min) | Sulfuric Acid Conc. (M) | Leach Temp. (° C.) |
|---|---|---|---|---|---|---|
| 750-1500 | 3.0 | 982 | 45 | 60 | 0.2 | 95 |
| 1501-2500 | 6.0 | 982 | 45 | 60 | 0.2 | 95 |
| 2501-3750 | 7.0 | 1021 | 45 | 60 | 0.2 | 95 |

Examples of the properties of the fast grade products that were prepared in the present disclosure are given in following Tables.

Example 3A—Exemplary Flux Calcined Products

The bulk chemistry of two flux calcined products generated from the polish acid washing of the flux-calcined products as determined by XRF analysis and other physical properties are presented in Table 22, showing the properties of these products. The results include the unique iron oxide content of 0.00 (wt %) $Fe_2O_3$ and the low sodium oxide content of the products versus the high permeabilities. The centrifuged wet density is in a range from 0.160 g/ml (10.0 lb/ft$^3$) to 0.208 g/ml (13.0 lb/ft$^3$) with silica specific volume in a range from 4.7 to 6.0. The Extractable Metals Factor for the present invention is very low, in the range of 2.0 to 3.8.

TABLE 22

Example 3A - Exemplary Flux Calcined Products

| | Product from Ore Source A | Product from Ore Source B |
|---|---|---|
| [1]Perm (mD) | 1255 | 1120 |
| $SiO_2$ (wt %) | 96.96 | 97.77 |
| $Al_2O_3$ (wt %) | 1.05 | 1.14 |
| CaO (wt %) | 0.08 | 0.14 |
| MgO (wt %) | 0.09 | 0.09 |
| $Na_2O$ (wt %) | 0.94 | 0.62 |
| $K_2O$ (wt %) | 0.14 | 0.07 |
| $Fe_2O_3$ (wt %)[5] | 0.00 | 0.00 |
| MnO (wt %) | 0.01 | 0.01 |
| $TiO_2$ (wt %) | 0.71 | 0.11 |
| $P_2O_5$ (wt %) | 0.02 | 0.02 |
| Sum | 100.0 | 100.0 |
| [2]CWD (g/ml) | 0.162 | 0.208 |
| CWD (lb/ft$^3$) | 10.1 | 13.0 |
| [3]SSV | 6.0 | 4.7 |
| [4]EMF (ppm) | 3.8 | 2.0 |

[1]Permeability of Product - millidarcies
[2]Centrifuged Wet Density (CWD)
[3]Silica Specific Volume (SSV)
[4]Extractable Metals Factor (EMF)
[5]Determined by XRF; lowest amount detectable by XRF is 0.001%

Example 3B—Exemplary Flux Calcined Products

Table 23 shows the bulk chemistry and other physical properties of two exemplary product samples with permeabilities of about 2000 millidarcies. The lower $Na_2O$ concentration in the present invention confirms the high efficiency of the polish leaching process in removing non-siliceous mineral impurities in the product.

TABLE 23

Example 3B - Exemplary Flux Calcined Products

| | Product from Ore source A | Product from Ore source B |
|---|---|---|
| [1]Perm (mD) | 2051 | 1995 |
| $SiO_2$ (wt %) | 96.65 | 97.40 |
| $Al_2O_3$ (wt %) | 1.06 | 1.02 |
| CaO (wt %) | 0.08 | 0.12 |
| MgO (wt %) | 0.09 | 0.06 |
| $Na_2O$ (wt %) | 1.24 | 1.24 |
| $K_2O$ (wt %) | 0.10 | 0.04 |
| $Fe_2O_3$ (wt %)[5] | 0.00 | 0.00 |
| MnO (wt %) | 0.01 | 0.01 |
| $TiO_2$ (wt %) | 0.71 | 0.09 |
| $P_2O_5$ (wt %) | 0.02 | 0.02 |
| Sum | 100.0 | 100.0 |
| [2]CWD (g/ml) | 0.162 | 0.232 |
| CWD (lb/ft$^3$) | 10.1 | 14.5 |
| [3]SSV | 6.0 | 4.2 |
| [4]EMF (ppm) | 2.1 | 4.0 |

[1]Permeability of Product - millidarcies
[2]Centrifuged Wet Density (CWD)
[3]Silica Specific Volume (SSV)
[4]Extractable Metals Factor (EMF)
[5]Determined by XRF; lowest amount detectable by XRF is 0.001%

Example 3C—Exemplary Flux Calcined Products

Table 24 shows two examples of the chemistry of two exemplary products with permeabilities of 3127 and 3537 millidarcies. The silica content is about 96% (w/w) $SiO_2$ with Alumina of about 1.2% (w/w) $Al_2O_3$ and iron oxide of 0.00% (w/w) $Fe_2O_3$. The soda flux content is in a range of 1.6% to 1.9% (w/w) $Na_2O$. This level of soda is far lower than the amount initially used in the calcination of these high permeability products. The amount of soda ash used in the calcination feed was about 7% (w/w) $Na_2CO_3$, which is equivalent to 4.1% $Na_2O$. The final soda contents of 1.67% and 1.85% (w/w) $Na_2O$ in examples A and B, respectively, show the efficiency of the polish leaching process in reducing the available metals solubles in the product, providing it with the ultra-low extractable levels.

TABLE 24

Exemplary Flux Calcined Products

| | Product from Ore source A | Product from Ore source B |
|---|---|---|
| [1] Perm (mD) | 3537 | 3127 |
| $SiO_2$ (wt %) | 96.37 | 96.23 |
| $Al_2O_3$ (wt %) | 1.20 | 1.16 |
| CaO (wt %) | 0.11 | 0.17 |
| MgO (wt %) | 0.12 | 0.09 |
| $Na_2O$ (wt %) | 1.67 | 1.85 |
| $K_2O$ (wt %) | 0.10 | 0.12 |

TABLE 24-continued

Exemplary Flux Calcined Products

| | Product from Ore source A | Product from Ore source B |
|---|---|---|
| $Fe_2O_3$ (wt %)[5] | 0.00 | 0.00 |
| MnO (wt %) | 0.01 | 0.01 |
| $TiO_2$ (wt %) | 0.40 | 0.35 |
| $P_2O_5$ (wt %) | 0.02 | 0.02 |
| Sum | 100.0 | 100.0 |
| [2]CWD (g/ml) | 0.168 | 0.232 |
| CWD (lb/ft³) | 10.5 | 14.5 |
| [3]SSV | 5.7 | 3.9 |
| [4]EMF (ppm) | 5.0 | 5.0 |

[1]Permeability of Product - millidarcies
[2]Centrifuged Wet Density (CWD)
[3]Silica Specific Volume (SSV)
[4]Extractable Metals Factor (EMF)
[5]Determined by XRF; lowest amount detectable by XRF is 0.001%

REFERENCES

The disclosures of the publications, patents and published patent specifications referenced below are hereby incorporated by reference into the present disclosure in their entirety to more fully describe the state of the art of which this invention pertains.

Analitika—EBC, 4 Aug. 1987 issue, page D 257, 11.8. Filtrationsleistung.
Bregar, G. W., (1951) Diatomaceous earth product and method for its manufacture, U.S. Pat. No. 2,701,240.
Bradley, T. G., et al. (1979), U.S. Pat. No. 4,134,857.
Showa Chemical Industry Co., Ltd, Publication 95.1.200(3), 1995.
Nielsen, R. B. et al. (1979), U.S. Pat. No. 4,142,968.
Austin, F. J., et al. (1990), U.S. Pat. No. 4,965,084.
Shiuh, J. C., et al. (1997), U.S. Pat. No. 5,656,568.
Shiuh, J. C., et al. (2003), U.S. Pat. No. 6,653,255.
Ting, P. L., et al. (2011), US Publication No. 2011/0223301.
Wang et al., (2008), PCT No. 2007/076723.
Antonides, L. E. (1997), Diatomite. Woods, P. (2011) Diatoms of the United States.
Kouloheris, A. P., U.S. Pat. No. 3,572,500.
Enrico et al., (1948), *Diatomaceous Earth Silicosis*.
Sulpizio, T. E. (1999), *Advances in Filter Aid and Precoat Filtration Technology*.
Technical Note AMC02, version 3.5, *Comparing Conventional Diatomite and Celpure Filter Aids*, (2002).
Technical Note: AMC10-Celpure-C, Celpure Regulatory Support Package, version 1.8, 2008. *Methods of Analysis of the American Society of Brewing Chemist*, 1987.
Breese R. O. Y. et al. (2006), *Industrial Minerals and Rocks—Commodities, Markets and Uses*, 7th edition, Diatomite, Pg. 442.
El-Shafey, E. L., et al. (2004), J. de Cravalho, September Sci. Technol. 39, pg. 3237.
Mahani, H. et al. (2003), *Treatment of diatomaceous earth to obtain its catalyst support*, Scientia Iranica, vol. 10, No. 3, Pg. 350-356.
Mikulasik, et al., (2014), U.S. Pat. No. 8,883,860.
Rees, R. H., et al, 1990, "Let Diatomite Enhance Your Filtration," Chemical Engineering, Vol. 97, No. 8, August, pp. 72-74.
Cain, C. W., 1984, "Filter Aid Use in Filtration," Encyclopedia of Chemical Processing and Design New York, Marcel Dekker, pp. 348-372.
Santa Barbara County APCD, draft permit to operate No. 5840-R5 Part II, November 2015.
Taniguchi, J. D., International Patent No. PCT/US2014/067873

We claim:

1. A diatomaceous earth product, the product comprising diatomaceous earth from ore that is sourced from a lacustrine diatomite deposit, wherein the diatomaceous earth has an intricate and porous structure of diatomite, comprises a plurality of diatom frustules derived from diatoms of the genera *Cymbella* or *Stephanodiscus* or *Aulacoseira*, and has:
   a silica specific volume in a range of greater than 3.8 to 6.0; and
   a total alkali oxide content of less than 1.1 wt % when a permeability of the diatomaceous earth is 150 millidarcies to 1500 millidarcies, or a total alkali oxide content in a range of 1.1 wt % to 2.2 wt % when the permeability of the diatomaceous earth is in a range of greater than 1500 millidarcies to 3750 millidarcies.

2. A filtration product comprising the diatomaceous earth product of claim 1, the diatomaceous earth having an iron oxide content less than or equal to 0.09% and greater than or equal to a non-detectable level, and a silica specific volume in a range of 4.1 to 6.0.

3. A filtration product comprising the diatomaceous earth product of claim 1, the diatomaceous earth having a silica specific volume in a range of 4.1 to 6.0, and a mole oxide ratio, in percentage form, of iron oxide to aluminum oxide of less than 9%.

4. A filtration product comprising the diatomaceous earth product of claim 1, the diatomaceous earth having a silica specific volume in a range of greater than 3.9 to 6.0.

5. The diatomaceous earth product of claim 1, wherein the diatomaceous earth further has a permeability in a range of 10 millidarcies to 1500 millidarcies, wherein the silica specific volume is in a range of 4.9 to 6.0.

6. The diatomaceous earth product of claim 1, wherein the diatomaceous earth further has a permeability in a range of greater than 1500 millidarcies to 3750 millidarcies.

7. The diatomaceous earth product of claim 1, wherein the diatomaceous earth is flux-calcined and further has a permeability in a range of 150 millidarcies to 1500 millidarcies, and a total alkali metals oxide content of less than 1.1 wt %.

8. The diatomaceous earth product of claim 1, wherein the diatomaceous earth is flux-calcined and further has a permeability in a range of greater than 1500 millidarcies to 3750 millidarcies, and a total alkali metals oxide content of less than 2.2 wt %.

9. A filtration product comprising the diatomaceous earth product of claim 1, wherein the diatomaceous earth further has an EMF of 2 to 5 ppm.

10. The product of claim 1, wherein the diatomaceous earth has a permeability of 150 millidarcies to 1500 millidarcies and further has a stoichiometric ratio of sodium oxide to aluminum oxide in a range of 50% to 200%.

11. The product of claim 1, wherein the diatomaceous earth has a permeability in a range of greater than 1500 to 3750 millidarcies and further has a stoichiometric ratio of sodium oxide to aluminum oxide in a range of 100% to 350%.

12. The product of claim 1, wherein the diatomaceous earth has a permeability of 150 millidarcies to 1500 millidarcies and has a silica specific volume in a range of 4.9 to 6.0.

13. The product of claim 1, wherein the diatomaceous earth has a permeability in a range of greater than 1500 millidarcies to 3750 millidarcies and has a silica specific volume in a range of 4.1 to 6.0.

14. The product of claim 1, wherein the diatomaceous earth has a permeability in a range of 150 millidarcies to 750 millidarcies and further has an extractable metals factor in a range of 2 to 4 ppm.

15. The product of claim 1, wherein the diatomaceous earth has a permeability in a range of 150 millidarcies to 750 millidarcies and further has an extractable metals factor in a range of 6 to 11 ppm.

16. The product of claim 1, wherein the diatomaceous earth has a permeability in a range of 150 millidarcies to 750 millidarcies and further has an extractable metals factor in a range of 2 to 5 ppm.

17. The product of claim 1, wherein the diatomaceous earth has a permeability greater than 1500 millidarcies to 3750 millidarcies and further has an extractable metals factor in a range of 2 to 7 ppm.

18. The product of claim 1, wherein the diatomaceous earth has a solubility parameter selected from the group consisting of: an ASBC soluble iron that is below a detection limit of 0.1 mg Fe/kg; an ASBC soluble aluminum content of less than 1 mg Al/kg; an ASBC soluble calcium content of less than 1 mg Ca/kg or combinations thereof.

19. The product of claim 1, wherein the diatomaceous earth has an extractable metal factor selected from the group consisting of: an EBC extractable iron content of 0.5 ppm to 2 ppm, an EBC extractable aluminum content of less than 1.5 ppm to below a limit of detection, an EBC extractable calcium content of less than 2.5 ppm or combinations thereof.

20. A method of manufacturing ultra-high purity, ultra-high performance diatomite filtration media comprising:

selecting a crude diatomaceous earth run-of-mine feed ore that is sourced from a lacustrine diatomite deposit and comprises a plurality of diatom frustules derived from diatoms of the genera *Cymbella* or *Stephanodiscus* or *Aulacoseira*, the feed ore having at least a silica content of 80 wt % (w/w) $SiO_2$ to about 99 wt % on an ignited basis and a maximum centrifuged wet density of 0.256 g/ml after milling;

pressure leaching the feed ore with an inorganic acid to produce a leached ore;

rinsing the leached ore to produce a rinsed leached ore; and calcining the rinsed leached ore to produce a calcined media, the calcining within a temperature range of about 871° C. to about 1150° C. in either (a) the absence of a fluxing agent, or (b) the presence of 0.6 wt % to 4.0 wt % alkali oxide fluxing agent.

21. The method of claim 20 further comprising acid leaching the calcined media.

22. The method of claim 21, wherein an acid concentration used for the acid leaching of the calcined media is in a range of 0.05 mole/liter to 1.0 mole/liter.

23. The method of claim 21, wherein the acid leaching of the calcined media utilizes an acid that comprises (i) inorganic acid, or (ii) organic acid and inorganic acid.

24. The method of claim 23, wherein the inorganic acid includes a mineral acid.

25. The method of claim 24, wherein the mineral acid includes sulfuric acid, nitric acid, hydrofluoric acid, hydrochloric acid, perchloric acid or mixtures thereof.

26. The method of claim 23, wherein the organic acid includes citric acid, ethylenediaminetetraacetic acid, glutamic acid, malate or mixtures thereof.

\* \* \* \* \*